US012670541B2

(12) United States Patent
Munkberg et al.

(10) Patent No.: US 12,670,541 B2
(45) Date of Patent: Jun. 30, 2026

(54) MOTION BLUR AND DEPTH OF FIELD RECONSTRUCTION THROUGH TEMPORALLY STABLE NEURAL NETWORKS

(71) Applicant: Nvidia Corporation, Santa Clara, CA (US)

(72) Inventors: Carl Jacob Munkberg, Skane (SE); Jon Hasselgren, Bunkeflostrad (SE); Marco Salvi, Seattle, WA (US)

(73) Assignee: NVIDIA Corporation, Santa Clara, CA (US)

( * ) Notice: Subject to any disclaimer, the term of this patent is extended or adjusted under 35 U.S.C. 154(b) by 503 days.

(21) Appl. No.: 17/213,941

(22) Filed: Mar. 26, 2021

(65) Prior Publication Data

US 2021/0264562 A1    Aug. 26, 2021

Related U.S. Application Data

(63) Continuation of application No. 16/422,601, filed on May 24, 2019, now Pat. No. 10,970,816.

(Continued)

(51) Int. Cl.
*G06T 3/00*       (2024.01)
*G06T 1/20*       (2006.01)
(Continued)

(52) U.S. Cl.
CPC ................. *G06T 3/18* (2024.01); *G06T 1/20* (2013.01); *G06T 5/70* (2024.01); *G06T 5/73* (2024.01);
(Continued)

(58) Field of Classification Search
CPC ......... G06T 7/0069; G06T 7/751; G06T 7/20; G06T 7/579; G06T 7/50; G06T 5/005;
(Continued)

(56) References Cited

U.S. PATENT DOCUMENTS 6,028,608 A      2/2000   Jenkins
6,801,655 B2    10/2004   Woodall
(Continued)

FOREIGN PATENT DOCUMENTS

CN          103873915 A      6/2014
CN          105408935 A      3/2016
(Continued)

OTHER PUBLICATIONS

Reshetov, "Morphological Antialiasing," Proceedings of the Conference on High Performance Graphics, 2009, 8 pages.
(Continued)

*Primary Examiner* — Duy M Dang
(74) *Attorney, Agent, or Firm* — Davis Wright Tremaine LLP

(57)          ABSTRACT

A neural network structure, namely a warped external recurrent neural network, is disclosed for reconstructing images with synthesized effects. The effects can include motion blur, depth of field reconstruction (e.g., simulating lens effects), and/or anti-aliasing (e.g., removing artifacts caused by sampling frequency). The warped external recurrent neural network is not recurrent at each layer inside the neural network. Instead, the external state output by the final layer of the neural network is warped and provided as a portion of the input to the neural network for the next image in a sequence of images. In contrast, in a conventional recurrent neural network, hidden state generated at each layer is provided as a feedback input to the generating layer. The neural network can be implemented, at least in part, on a processor. In an embodiment, the neural network is implemented on at least one parallel processing unit.

20 Claims, 12 Drawing Sheets

Related U.S. Application Data

(60) Provisional application No. 62/718,297, filed on Aug. 13, 2018.

(51) Int. Cl.
  *G06T 3/18* (2024.01)
  *G06T 5/70* (2024.01)
  *G06T 5/73* (2024.01)

(52) U.S. Cl.
  CPC .............. *G06T 2207/20084* (2013.01); *G06T 2207/20201* (2013.01)

(58) Field of Classification Search
  CPC .. G06T 5/50; G06T 7/74; G06T 7/246; G06T 7/277; G06T 7/75; G06T 7/251; G06T 7/248; G06K 9/6267; G06K 9/3233; G06K 9/66; G06K 9/00335; G06K 9/00664; G06K 9/4628; G06K 9/6274; H04N 13/117; H04N 19/553; H04N 13/00; H04N 19/00; G06N 20/00; G06N 20/10; G06N 20/20
  See application file for complete search history.

(56) References Cited

U.S. PATENT DOCUMENTS

| | | | |
|---|---|---|---|
| 7,346,208 | B2 | 3/2008 | Staelin et al. |
| 7,554,540 | B2 | 6/2009 | Hayes |
| 8,345,962 | B2 | 1/2013 | Yu et al. |
| 8,913,822 | B2 | 12/2014 | Matsuda et al. |
| 8,934,542 | B2 | 1/2015 | Wiegand et al. |
| 9,430,817 | B2 | 8/2016 | Schelten et al. |
| 9,785,886 | B1 | 10/2017 | Andoni et al. |
| 9,915,625 | B2 | 3/2018 | Gao et al. |
| 10,430,913 | B2 | 10/2019 | Chen et al. |
| 10,482,584 | B1 | 11/2019 | Kim et al. |
| 10,552,739 | B1 | 2/2020 | Rausch et al. |
| 10,701,394 | B1 | 6/2020 | Caballero et al. |
| 11,256,990 | B2 | 2/2022 | Lanctot et al. |
| 11,270,603 | B1 | 3/2022 | Bansal et al. |
| 2006/0159369 | A1 | 7/2006 | Young |
| 2006/0233258 | A1 | 10/2006 | Holcomb |
| 2008/0232452 | A1 | 9/2008 | Sullivan et al. |
| 2011/0141348 | A1 | 6/2011 | Jia et al. |
| 2012/0051426 | A1 | 3/2012 | Takagi et al. |
| 2012/0219236 | A1 | 8/2012 | Ali et al. |
| 2014/0204111 | A1 | 7/2014 | Vaidyanathan et al. |
| 2014/0328400 | A1 | 11/2014 | Puri et al. |
| 2014/0333669 | A1* | 11/2014 | Stich ....................... G06T 13/80 |
| | | | 345/634 |
| 2015/0242180 | A1 | 8/2015 | Boulanger-Lewandowski et al. |
| 2016/0117800 | A1 | 4/2016 | Korkin |
| 2016/0353164 | A1 | 12/2016 | Smolic et al. |
| 2016/0378863 | A1 | 12/2016 | Shlens et al. |
| 2017/0091619 | A1 | 3/2017 | Towal et al. |
| 2017/0124742 | A1* | 5/2017 | Hasselgren ............... G06T 7/44 |
| 2017/0169602 | A1 | 6/2017 | Blackmon et al. |
| 2017/0206405 | A1 | 7/2017 | Molchanov et al. |
| 2017/0235476 | A1* | 8/2017 | Hughes ............... G06F 3/04847 |
| | | | 715/748 |
| 2017/0256033 | A1 | 9/2017 | Tuzel et al. |
| 2017/0272722 | A1 | 9/2017 | Salvi et al. |
| 2017/0308734 | A1* | 10/2017 | Chalom ............... G06V 40/193 |
| 2017/0345140 | A1 | 11/2017 | Zhang et al. |
| 2018/0007362 | A1 | 1/2018 | Krishnan |
| 2018/0025257 | A1 | 1/2018 | van den Oord |
| 2018/0075343 | A1 | 3/2018 | van den Oord et al. |
| 2018/0129918 | A1 | 5/2018 | Wang et al. |
| 2018/0253645 | A1 | 9/2018 | Burr |
| 2018/0293707 | A1 | 10/2018 | El-Khamy et al. |
| 2018/0293713 | A1 | 10/2018 | Vogels et al. |
| 2018/0295320 | A1 | 10/2018 | Breternitz et al. |
| 2018/0311663 | A1 | 11/2018 | Giera et al. |
| 2018/0314938 | A1 | 11/2018 | Andoni et al. |
| 2018/0336460 | A1 | 11/2018 | Tschernezki et al. |
| 2018/0357537 | A1 | 12/2018 | Munkberg et al. |
| 2018/0358003 | A1 | 12/2018 | Calle et al. |
| 2019/0014320 | A1 | 1/2019 | Navarrete Michelini et al. |
| 2019/0035363 | A1 | 1/2019 | Schluessler et al. |
| 2019/0043242 | A1 | 2/2019 | Risser |
| 2019/0073591 | A1 | 3/2019 | Andoni et al. |
| 2019/0096032 | A1 | 3/2019 | Li |
| 2019/0096046 | A1 | 3/2019 | Kalantari et al. |
| 2019/0108618 | A1 | 4/2019 | Hwang et al. |
| 2019/0180418 | A1 | 6/2019 | Kuybeda |
| 2019/0205736 | A1 | 7/2019 | Bleiweiss et al. |
| 2019/0206026 | A1 | 7/2019 | Vemulapalli et al. |
| 2019/0251397 | A1 | 8/2019 | Tremblay et al. |
| 2019/0251401 | A1 | 8/2019 | Shechtman et al. |
| 2019/0279076 | A1 | 9/2019 | Hu et al. |
| 2019/0304067 | A1 | 10/2019 | Vogels et al. |
| 2019/0342606 | A1 | 11/2019 | Kurokawa |
| 2019/0379883 | A1 | 12/2019 | Wang et al. |
| 2020/0020082 | A1 | 1/2020 | Zahneisen et al. |
| 2020/0027198 | A1 | 1/2020 | Vogels et al. |
| 2020/0027202 | A1 | 1/2020 | Oh et al. |
| 2020/0045348 | A1 | 2/2020 | Boyce et al. |
| 2020/0050923 | A1 | 2/2020 | Patney et al. |
| 2020/0077023 | A1 | 3/2020 | Kang et al. |
| 2020/0089998 | A1 | 3/2020 | Zagaynov et al. |
| 2020/0090305 | A1 | 3/2020 | El-Khamy et al. |
| 2020/0126191 | A1 | 4/2020 | Munkberg et al. |
| 2020/0134797 | A1 | 4/2020 | Zhang et al. |
| 2020/0160105 | A1 | 5/2020 | Kehl |
| 2020/0186544 | A1 | 6/2020 | Dichiu et al. |
| 2020/0226418 | A1 | 7/2020 | Dorai-Raj et al. |
| 2020/0265567 | A1 | 8/2020 | Hu et al. |
| 2020/0302236 | A1 | 9/2020 | Gao et al. |
| 2020/0327702 | A1 | 10/2020 | Wang et al. |
| 2020/0364509 | A1 | 11/2020 | Weinzaepfel et al. |
| 2020/0364834 | A1 | 11/2020 | Ferrés et al. |
| 2020/0402205 | A1 | 12/2020 | Su et al. |
| 2021/0125583 | A1 | 4/2021 | Kaplanyan et al. |
| 2021/0142176 | A1 | 5/2021 | Ratner et al. |
| 2021/0142455 | A1 | 5/2021 | Hsiao et al. |
| 2021/0142479 | A1 | 5/2021 | Phogat et al. |
| 2021/0150674 | A1 | 5/2021 | Cai et al. |
| 2021/0232897 | A1 | 7/2021 | Bichler et al. |
| 2021/0233210 | A1 | 7/2021 | Elron et al. |
| 2021/0266496 | A1 | 8/2021 | Qin et al. |
| 2021/0272258 | A1 | 9/2021 | Sharma et al. |
| 2021/0279950 | A1 | 9/2021 | Phalak |
| 2021/0303912 | A1 | 9/2021 | Yu et al. |
| 2021/0342670 | A1 | 11/2021 | van den Oord et al. |
| 2021/0342974 | A1 | 11/2021 | Zhang et al. |
| 2021/0366082 | A1 | 11/2021 | Xiao et al. |
| 2021/0383537 | A1 | 12/2021 | Chitiboi et al. |
| 2022/0058420 | A1 | 2/2022 | Peng et al. |
| 2022/0108425 | A1 | 4/2022 | Chen et al. |
| 2022/0128724 | A1 | 4/2022 | Sen et al. |
| 2022/0138903 | A1 | 5/2022 | Liu et al. |

FOREIGN PATENT DOCUMENTS

| | | |
|---|---|---|
| CN | 106204449 A | 12/2016 |
| CN | 106331433 A | 1/2017 |
| CN | 108053456 A | 5/2018 |
| CN | 108805794 A | 11/2018 |
| CN | 108989731 A | 12/2018 |
| CN | 109034385 A | 12/2018 |
| CN | 109785235 A | 5/2019 |
| CN | 109862370 A | 6/2019 |
| CN | 109952577 A | 6/2019 |
| CN | 110046537 A | 7/2019 |
| CN | 110100252 A | 8/2019 |
| CN | 110458778 A | 11/2019 |
| CN | 110582748 A | 12/2019 |
| CN | 111402379 A | 7/2020 |
| CN | 111783817 A | 10/2020 |
| CN | 111798450 A | 10/2020 |
| DE | 69739577 | 10/2009 |
| DE | 102018113845 A1 | 12/2018 |

(56)                References Cited

FOREIGN PATENT DOCUMENTS

| DE | 102021128623 A1 | 5/2022 |
|---|---|---|
| EP | 3739523 A1 | 11/2020 |
| JP | 2000041253 A | 2/2000 |
| JP | 2012515493 A | 7/2012 |
| JP | 2019132798 A | 8/2019 |
| KR | 20050100321 A | 10/2005 |
| WO | 0131568 A1 | 5/2001 |
| WO | 2012073865 A1 | 6/2012 |
| WO | 2015015195 A1 | 2/2015 |
| WO | 2017136784 A1 | 8/2017 |
| WO | 2018072308 A1 | 4/2018 |
| WO | 2019066794 A1 | 4/2019 |
| WO | 2019157599 A1 | 8/2019 |
| WO | 2019180414 A1 | 9/2019 |
| WO | 2020068140 A1 | 4/2020 |
| WO | 2020172043 A2 | 8/2020 |
| WO | 2020192471 A1 | 10/2020 |

OTHER PUBLICATIONS

Saeckinger et al., "Application of the ANNA Neural Network Chip to High-Speed Character Recognition," Mar. 18, 1991, 22 pages.

Salvi et al., "Surface Based Anti-Aliasing," Proceedings of the ACM SIGGRAPH Symposium on Interactive 3D Graphics and Games, 2012, 6 pages.

Salvi, "Deep Learning: The Future of Real-Time Rendering?" NVIDIA, 2017, 53 pages.

Schied et al., "Spatiotemporal Variance-Guided Filtering: Real-Time Reconstruction for Path-Traced Global Illumination," In Proceedings of HPG, 2017, 12 pages.

Schmidhuber, "Deep Learning in Neural Networks: An Overview," Oct. 8, 2014, 88 pages.

Simonyan et al., "Very Deep Convolutional Networks for Large-Scale Image Recognition," Apr. 10, 2015, 14 pages.

Son et al., "Fast Non-blind Deconvolution via Regularized Residual Networks with Long/Short Skip-Connections," 2017, 10 pages.

Sze et al., Efficient Processing of Deep Neural Networks: A Tutorial and Survey, Aug. 13, 2017, 32 pages.

Tsafi, "Image Scaling using Deep Convolutional Neural Networks," retrieved from https://engineering.flipboard.com/2015/05/scaling-convnets, Jun. 26, 2018, 36 pages.

Vincent et al., "Extracting and Composing Robust Features with Denoising Autoencoders," Proceedings of the 25th International Conference on Machine Learning, 2008, 8 pages.

Wang et al., "Image Quality Assessment: From Error Visibility to Structural Similarity," IEEE Transactions on Image Processing, 13(4): Apr. 2004, 14 pages.

Xie et al., "Image Denoising and Inpainting with Deep Neural Networks," Proceedings of the 25th International Conference on Neural Information Processing Systems, 2012, 9 pages.

Yang et al., "Amortized Supersampling," ACM Transactions on Graphics, 28(5): Dec. 2009, 12 pages.

Abadi et al., "TensorFlow: Large-Scale Machine Learning on Heterogeneous Systems," retrieved from https://www.tensorflow.org/, 2015, 10 pages.

Akeley, "Reality Engine Graphics," Proceedings of the 20th Annual Conference on Computer Graphics and Interactive Techniques, 1993, 8 pages.

Bako et al., "Kernel-Predicting Convolutional Networks for Denoising Monte Carlo Renderings," 2017, 14 pages.

Bavoil et al., "Aggregate G-Buffer Anti-Aliasing in Unreal Engine 4," 2016, 45 pages.

Bengio et al., "Recurrent Neural Networks for Adaptive Temporal Processing," AT&T Bell Laboratories, 1993, 35 pages.

Benty et al., "The Falcor Rendering Framework," retrieved from https://github.com/NVIDIAGameWorks/Falcor, 2019, pages.

Bigdeli et al., "Image Restoration using Autoencoding Priors," CoRR, 2017, 12 pages.

Chaitanya et al., "Interactive Reconstruction of Monte Carlo Image Sequences Using a Recurrent Denoising Autoencoder," ACM Trans. Graph. 36, 4, Article 98, 2017, 12 pages.

Chajdas et al., "Subpixel Reconstruction Antialiasing for Deferred Shading," Symposium on Interactive 3D Graphics and Games, 2011, 7 pages.

Chollet et al., "Keras," GitHub, retrieved from https://github.com/fchollet/keras, 2015, 7 pages.

Clarberg et al., "A Sort-based Deferred Shading Architecture for Decoupled Sampling," ACM Transactions on Graphics, 32(4): 2013, 10 pages.

Deering et al., "The Triangle Processor and Normal Vector Shader: A VLSI System for High Performance Graphics," Proceedings of the 15th Annual Conference on Computer Graphics and Interactive Techniques, 22(4): Aug. 1988, 10 pages.

Dosovitskiy et al., "Generating Images with Perceptual Similarity Metrics Based on Deep Networks," Feb. 9, 2016, 14 pages.

Durant et al., "NVIDIA Tesla V100 Gpu Architecture Whitepaper. Technical Report. NVIDIA Corporation," retrieved from http://www.nvidia.com/object/volta-architecture-whitepaper.html, 2017, 58 pages.

Epic Games, "Unreal Engine 4," Wikipedia, 2012, 27 pages.

Fatahalian et al., "Reducing Shading on GPUs Using Quadfragment Merging," ACM SIGGRAPH, 2010, 8 pages.

Fedkiw et al., "Visual Simulation of Smoke," Proceedings of the 28th Annual Conference on Computer Graphics and Interactive Techniques, 2001, 8 pages.

Fuchs et al., "Fast Spheres, Shadows, Textures, Transparencies, and Image Enhancements in Pixel-Planes," Advances in Computer Graphics, 1985, 10 pages.

Haeberli et al., "The Accumulation Buffer: Hardware Support for High-quality Rendering," Proceedings of the 17th Annual Conference on Computer Graphics and Interactive Techniques, 1990, 10 pages.

He et al., "Deep Residual Learning for Image Recognition", Dec. 10, 2015, pp. 1-12.

IEEE, "IEEE Standard 754-2008 (Revision of IEEE Standard 754-1985): IEEE Standard for Floating-Point Arithmetic," Aug. 29, 2008, 70 pages.

Iglesias-Guitian et al., "Pixel History Linear Models for Real-Time Temporal Filtering," Computer Graphics Forum, 35(7): 2016, 10 pages.

Jaderberg et al., "Spatial Transformer Networks," In Neural Information Processing Systems, 2015, 9 pages.

Jia et al., "Dynamic Filter Networks," NeurIPS, 2016, 9 pages.

Jimenez et al., "Filmic SMAA: Sharp Morphological and Temporal Antialiasing4," Advances in Real-Time Rendering in Games, SIGGRAPH Courses, 2016, 122 pages.

Jimenez et al., "Filtering Approaches for Real-time Anti-aliasing," ACM SIGGRAPH, 2011, 14 pages.

Jimenez et al., "SMAA: Enhanced Subpixel Morphological Antialiasing," Computer Graphics Forum, May 2012, 15 pages.

Jimenez et al., "Smaa: Enhanced Subpixel Morphological Antialiasing," Eurographics, 2012, 15 pages.

Johnson et al., "Perceptual Losses for Real-Time Style Transfer and Super-Resolution," ECCV, 2016, 17 pages.

Jégou et al., "The One Hundred Layers Tiramisu: Fully Convolutional DenseNets for Semantic Segmentation," Dec. 5, 2016, 9 pages.

Karis et al., "High-Quality Temporal Supersampling," Advances in Real-Time Rendering in Games, 2014, 55 pages.

Kerzner et al., "Streaming G-Buffer Compression for Multi-Sample Anti-Aliasing," Proceedings of High Performance Graphics, 2014, 7 pages.

Kingma et al. "Adam: A Method for Stochastic Optimization," arXiv:1412.6980, dated Dec. 22, 2014, 9 pages.

Lauritzen, "Deferred Rendering for Current and Future Rendering Pipelines," Technical Report, Intel Corporation, 2010, 34 pages.

Lecun et al., "Gradient-Based Learning Applied to Document Recognition," Proceedings of the IEEE, 86(11): 1998, 47 pages.

Lottes, "FXAA," Technical Report, NVIDIA, Feb. 2009, 15 pages.

Malan, "Real-time Global Illumination and Reections in Dust 514," Advances in Real-Time Rendering in Games, 2012, 51 pages.

Mammen,"Transparency and Antialiasing Algorithms Implemented with the Virtual Pixel Maps Technique," IEEE Computer Graphics and Applications, 9(4): Jul. 1989, 13 pages.

(56) References Cited

OTHER PUBLICATIONS

Mao et al., "Image Restoration Using Convolutional Auto-encoders with Symmetric Skip Connections," Aug. 30, 2016, 17 pages.
Mara et al., "An Efficient Denoising Algorithm for Global Illumination," Proceedings of High Performance Graphics, 2017, 7 pages.
Mildenhall et al., "Burst Denoising with Kernel Prediction Networks," IEEE Conference on Computer Vision and Pattern Recognition, 2018, 9 pages.
Nalbach et al., "Deep Shading: Convolutional Neural Networks for Screen Space Shading," Computer Graphics Forum, 36(4): 2016, 9 pages.
Nehab et al., "Accelerating Real-time Shading with Reverse Reprojection Caching," Proceedings of the 22nd ACM SIGGRAPH/EuroGraphics Symposium on Graphics Hardware, 2007, 11 pages.
Niklaus et al., "Video Frame Interpolation via Adaptive Convolution," CVPR, 2017, 10 pages.
Niklaus et al., "Video Frame Interpolation via Adaptive Separable Convolution," ICCV, 2017, 10 pages.
Nilsson et al., "Semantic Video Segmentation by Gated Recurrent Flow Propagation," Dec. 28, 2016, 10 pages.
NVIDIA Research, "NVIDIA OptiX AI-Accelerated Denoiser," 2017, 11 pages.
Patney et al., "Towards Foveated Rendering for Gaze-Tracked Virtual Reality," ACM Transactions on Graph, 2016, 12 pages.
Ragan-Kelley et al., "The Lightspeed Automatic Interactive Lighting Preview System," ACM SIGGRAPH, 2007, 112 pages.
Reshetov et al., "Reducing Aliasing Artifacts Through Resampling," Proceedings of the Fourth ACM SIGGRAPH/EuroGraphics Conference on High-Performance Graphics, 2012, 10 pages.
Combined Search and Examination Report for United Kingdom Application No. GB2316422.1, mailed Nov. 22, 2023, 4 pages.
Gu et al., "Integration of Spatial-Spectral Information for Resolution Enhancement in Hyperspectral Images," IEEE Transnactions on Geoscience and Remote Sensing, 46(5): May 1, 2008, 12 pages.
Hayat: "Super-Resolution via Deep Learning," Jun. 28, 2017, 33 pages.
Hsiao et al., "Video Enhancement via Super-Resolution Using Deep Quality Transfer Network," 9 Big Data Analytics in the Social and Ubiquitous Context 5th International Workshop on Modeling Social Media, XP047407319, Mar. 11, 2017, pp. 184-200.
International Search Report and Written Opinion for Application No. PCT/US2020/047898, dated Nov. 30, 2020, 11 pages.
International Search Report and Written Opinion for Application No. PCT/US2021/053803, mailed Feb. 3, 2022, filed Oct. 6, 2021, 11 pages.
Miravet et al., "A Two-Step Neural-Network Based Algorithm for Fast Image Super-Resolution," Image and Vision Computing, Elsevier, Guildford, 25(9): Jun. 14, 2007, 25 pages.
Notice of Acceptance for Australian Application No. 2020346707, mailed Jul. 10, 2023, 3 pages.
Office Action for Australian Application No. 2020346707, mailed Jan. 16, 2023, 3 pages.
Office Action for Korean Patent Application No. 10-2022-7011734, mailed Jun. 29, 2023, 7 pages.
Office Action for United Kingdom Application No. GB2201094.6, mailed Mar. 27, 2023, 2 pages.
Shi et al., Real-Time Single Image and Video Super-Resolution Using an Efficient Sub-Pixel Convolutional Neural Network, IEEE Conference on Computer Vision and Pattern Recognition, Jun. 27, 2016, 10 pages.
Office Action for Korean Application No. 10-2022-7015877, mailed Jul. 20, 2023, 12 pages.
Notice of Allowance for Korean Application No. 10-2022-7011734, mailed Jan. 24, 2024, 6 pages.
Office Action for Korean Application No. 10-2022-7015877, mailed Jan. 25, 2024, 5 pages.
Office Action for Australian Application No. 2023251540, mailed Jun. 7, 2024, 2 pages.
Office Action for Australian Application No. 2023251542, mailed Jun. 18, 2024, 3 pages.

Office Action for Australian Application No. 2023251547, mailed Jun. 18, 2024, 3 pages.
Office Action for Korean Application No. 10-2022-7015877, mailed Jun. 28, 2024, 5 pages.
Office Action for Korean Application No. 10-2024-7013803, mailed May 20, 2024, 5 pages.
Office Action for Korean Application No. 10-2024-7013804, mailed May 20, 2024, 6 pages.
Office Action for United Kingdom Application No. GB2115845.6, mailed Jul. 9, 2024, 3 pages.
Craven, "A Faster Learning Neural Network Classifier Using Selective Backpropagation," IEEE International Conference on Electronics, Circuits and Systems, 1997, 5 pages.
Examination Report for United Kingdom Application No. GB2205245.0, mailed Apr. 23, 2025, 6 pages.
Jiang et al., "Accelerating Deep Learning by Focusing on the Biggest Losers," 2019, 14 pages.
Office Action for Chinese Application No. 202111301494.3, mailed Feb. 12, 2025, 20 pages.
Office Action for Chinese Application No. 202111314003.9, mailed Feb. 12, 2025, 17 pages.
Office Action for Chinese Application No. 202180005531.8, mailed Mar. 5, 2025, 18 pages.
Office Action for Japanese Application No. 2022-526732, mailed Sep. 5, 2024, 4 pages.
Office Action for Japanese Application No. 2022-515469, mailed Nov. 8, 2024, 2 pages.
Office Action for Japanese Application No. 2022-525355, mailed Sep. 10, 2024, 7 pages.
Office Action for Japanese Application No. 2023-188129, mailed Oct. 8, 2024, 12 pages.
Office Action for Japanese Application No. 2023-188130, mailed Oct. 10, 2024, 9 pages.
Office Action for Japanese Application No. 2023-188131, mailed Oct. 8, 2024, 6 pages.
Office Action for Korean Patent Application No. 10-2024-7013803, mailed Nov. 22, 2024, 3 pages.
Office Action for Korean Patent Application No. 10-2024-7013804, mailed Nov. 22, 2024, 3 pages.
Office Action for Korean Patent Application No. 10-2024-7013805, mailed Nov. 22, 2024, 3 pages.
Office Action for United Kingdom Application No. GB2205245.0, mailed Sep. 3, 2024, 2 pages.
Oh et al., "Learning-based Video Motion Magnification", Aug. 1, 2018, 26 pages.
Rozantsev et al., "On Rendering Synthetic Images for Training an Object Detector," 2014, 30 pages.
United Kingdom Examination Report for Application No. GB2115845.6, mailed Apr. 15, 2025, 5 pages.
Manabe et al., "FPGA Implementation of a Video Super-Resolution System," IEICE Technical Report, May 12, 2016, 7 pages.
Office Action for Japanese Application No. 2022-515469, mailed Apr. 18, 2024, 6 pages.
Caballero et al., "Real-Time Video Super-Resolution with Spatio-Temporal Networks and Motion Compensation," 2017, 10 pages.
Chen et al., "Coherent Online Video Style Transfer," 2017, 10 pages.
Chu et al., "Temporally Coherent GANs for Video Super-Resolution (TecoGAN)," Nov. 23, 2018, 17 pages.
Combined Search and Examination Report for United Kingdom Application No. GB2311266.7, mailed Feb. 21, 2024, 4 pages.
Combined Search and Examination Report for United Kingdom Application No. GB2316421.3, mailed Feb. 26, 2024, 3 pages.
Hedman et al., "Deep Blending for Free-Viewpoint Image-Based Rendering," SIGGRAPH Asia Technical Papers, 2018, 15 pages.
International Search Report and Written Opinion for Application No. PCT/US2021/056477, mailed Feb. 9, 2022, filed Oct. 25, 2021, 14 pages.
Jordan, "Neural Networks: Training with Backpropagation," Data Science, Jul. 18, 2017, 32 pages.
Kappeler et al., "Video Super-Resolution With Convolutional Neural Networks," IEEE Transactions on Computational Imaging, 2(2): Jun. 1, 2016, 14 pages.

(56)                    References Cited

OTHER PUBLICATIONS

Kong et al., "A Conditional Random Field Model for Video Super-Resolution," International Conference on Pattern Recognition, Jan. 1, 2006, 4 pages.

Li et al., "Fast Spatio-Temporal Residual Network for Video Super-Resolution," CVPR, 2019, 10 pages.

Lore et al., "LLNet: A Deep Autoencoder Approach to Natural Low-light Image Enhancement," 2016, 11 pages.

Marín et al., "Learning Appearance in Virtual Scenarios for Pedestrian Detection," IEEE Conference on Computer Vision and Pattern Recognition, Jun. 13, 2010, 8 pages.

Office Action for German Application No. 10-218-117813.1, mailed Feb. 27, 2024, 14 pages.

Office Action for United Kingdom Application No. GB2115845.6, mailed Apr. 11, 2023, 4 pages.

Office Action for United Kingdom Application No. GB2316422.1, mailed Mar. 7, 2024, 4 pages.

Rematas et al., "Image-Based Synthesis and Re-synthesis of Viewpoints Guided by 3D Models," IEEE Conference on Computer Vision and Pattern Recognition, Jun. 23, 2014, 8 pages.

Rozantsev et al., "On Rendering Synthetic Images for Training an Object Detector," Computer Vision and Image Understanding Academic Press, vol. 137, Jan. 20, 2015, 30 pages.

Torres et al., "An Efficient Approach to Automatic Generation of Time-lapse Video Sequences," Proceedings of the 21st Irish Machine Vision and Image Processing Conference, 2019, 8 pages.

United Kingdom Combined Search and Examination Report for Patent Application No. 2115845.6 dated Jul. 7, 2022, 10 pages.

United Kingdom Combined Search and Examination Report for Patent Application No. 2116203.7 dated Jul. 12, 2022, 12 pages.

Wang et al., "Deep Learning for Image Super-Resolution: A Survey," IEEE Transactions on Pattern Analysis and Machine Intelligence, 43(10): Mar. 23, 2020, 23 pages.

Wang et al., "Video Super-Resolution via Residual Learning," May 14, 2018, 11 pages.

Decision of Rejection for Chinese Application No. 202111314003.9, mailed Oct. 31, 2025, 13 pages.

Office Action for Chinese Application No. 202080062960.4, mailed Dec. 3, 2025, 20 pages.

Office Action for Chinese Application No. 202111301494.3, mailed Oct. 15, 2025, 19 pages.

Office Action for Chinese Application No. 20211160114.3, mailed Dec. 2, 2025, 16 pages.

Office Action for Chinese Application No. 202211160111.X, mailed Dec. 23, 2025, 16 pages.

Examination Report for United Kingdom Application No. GB2115845.6, mailed Jul. 2, 2025, 4 pages.

Notice of Decision to Grant for Chinese Application No. 202180005531.8, mailed Jul. 11, 2025, 8 pages.

Office Action for Chinese Application No. 202111301494.3, mailed Jul. 9, 2025, 21 pages.

Examination Report for United Kingdom Application No. GB2115845.6, mailed Aug. 7, 2025, 3 pages.

Office Action for Chinese Application No. 202111314003.9, mailed Jul. 31, 2025, 17 pages.

Office Action for Chinese Application No. 202310920699.2, mailed Aug. 6, 2025, 14 pages.

Peng et al., "Deep Deconvolution Neural Network for Image Super-Resolution" 2017, 9 pages.

U.S. Appl. No. 17/089,445, filed Nov. 14, 2020.

U.S. Appl. No. 16/565,088, filed Sep. 9, 2019.

U.S. Appl. No. 17/543,075, filed Dec. 6, 2021.

U.S. Appl. No. 17/543,098, filed Dec. 6, 2021.

U.S. Appl. No. 18/219,594, filed Jul. 7, 2023.

U.S. Appl. No. 17/066,282, filed Oct. 8, 2020.

U.S. Appl. No. 17/172,330, filed Feb. 10, 2021.

U.S. Appl. No. 17/406,902, filed Aug. 19, 2021.

U.S. Appl. No. 17/710,643, filed Mar. 31, 2022.

U.S. Appl. No. 18/225,674, filed Jul. 24, 2023.

U.S. Appl. No. 16/422,601, filed May 24, 2019.

U.S. Appl. No. 17/080,503, filed Oct. 26, 2020.

Examination Report for United Kingdom Application No. GB2115845.6, mailed Jun. 5, 2025, 5 pages.

Office Action for Chinese Application No. 202080062960.4, mailed Apr. 27, 2025, 17 pages.

Decision of Rejection for Chinese Application No. 202111301494.3, mailed Jan. 14, 2026, 17 pages.

Notice of Decision to Grant for Chinese Application No. 202310920699.2, mailed Mar. 9, 2026, 5 pages.

Office Action for Chinese Application No. 202080062960.4, mailed Feb. 28, 2026, 8 pages.

* cited by examiner

100

RECEIVING A SEQUENCE OF INPUT DATA
102

PROCESSING A FIRST INPUT DATA FRAME TO
PRODUCE EXTERNAL STATE
104

WARPING THE EXTERNAL STATE, USING
DIFFERENCE DATA, TO PRODUCED A WARPED
EXTERNAL STATE
106

PROCESSING A SECOND INPUT DATA FRAME TO
PRODUCE A RECONSTRUCTED SECOND DATA
FRAME
108

600

Input Data
601

Data Assembly
610

Vertex Shading
620

Primitive Assembly
630

Geometry Shading
640

Viewport SCC
650

Rasterization
660

Fragment Shading
670

Raster Operations
680

Output Data
602

Convolution Layer

Max Pooling Layer

Up-sampling Layer

MOTION BLUR AND DEPTH OF FIELD RECONSTRUCTION THROUGH TEMPORALLY STABLE NEURAL NETWORKS

CLAIM OF PRIORITY

This application is a continuation of U.S. Non-Provisional application Ser. No. 16/422,601 titled "Motion Blur and Depth of Field Reconstruction through Temporally Stable Neural Networks," filed May 24, 2019 which claims benefit to U.S. Provisional Application No. 62/718,297 titled "Motion Blur and Depth of Field Reconstruction through Temporally Stable Neural Networks," filed Aug. 13, 2018, the entire contents of which are all incorporated herein by reference.

TECHNICAL FIELD

The present disclosure relates to image processing. More particularly, the present disclosure relates to techniques for reconstructing computer-generated images with synthesized effects.

BACKGROUND

Computer-generated images can be rendered by a variety of algorithms. Many of these algorithms are designed to create photo-realistic images using a variety of complicated techniques. Examples of algorithms used to create photo-realistic images include ray-tracing algorithms and rasterization algorithms with advanced lighting shaders. Various applications may require these algorithms to produce video streams that include photo-realistic images in real-time. The timing requirements can introduce significant limitations on the quality of images that can be produced at, e.g., 30 frames per second.

One technique to get around these limitations is to render the images using an algorithm that meets the timing constraints and then reconstruct a better quality image during a post-processing operation. This technique can separate the creation of visual effects such as lens flare, bokeh due to depth of field associated with a lens, motion blur, and the like from the rendering algorithm that translates a three-dimensional model or geometry into a two-dimensional image. However, these techniques are relatively new and the results are mixed. There is room to improve the post-processing techniques using new algorithms to model these visual effects. Thus, there is a need for addressing these issues and/or other issues associated with the prior art.

SUMMARY

A method, computer readable medium, and system are disclosed for reconstructing computer-generated images to include synthesized visual effects that are not included in the original computer-generated images. Motion blur, depth of field, or anti-aliasing effects can be added to an image that is rendered without these effects. In practice, a rendering algorithm can be designed to be simpler, and the rendered images produced by the rendering algorithm can be reconstructed by the neural network to include the desired effects in a post-processing stage.

In one embodiment, a method for reconstructing an image to include a visual effect includes the steps of: processing an input feature vector for a first input data frame of a sequence of input data using layers of a neural network model to produce external state including a reconstructed first data frame; warping the external state, using difference data corresponding to changes between the first input data frame and a second input data frame, to produce warped external state; and processing an input feature vector for the second input data frame using the layers of the neural network model to produce a reconstructed second data frame. The input feature vector for the second input data frame includes the second input data frame, the warped external state corresponding with the first input data frame, and guide data for one or more effects.

In one embodiment, the guide data includes motion vectors. In another embodiment, the guide data includes normal vectors. In yet another embodiment, the guide data includes depth values. In some embodiments, the guide data includes, for each pixel of the second input data frame, at least two of: a motion vector, a normal vector, a depth value, or a blur radius.

In one embodiment, the one or more effects include a motion blur effect. In another embodiment, the one or more effects include a depth of field blur effect. In yet another embodiment, the one or more effects include: an anti-aliasing effect, a motion blur effect, and a depth of field blur effect.

In one embodiment, the sequence of input data is rendered by a graphics processing pipeline configured to utilize one sample per pixel.

In one embodiment, a system is disclosed for reconstructing an image to include a visual effect. The system includes a memory and at least one processor in communication with the memory. The memory stores a sequence of input data, the sequence including a first input data frame and a second input data frame. The at least one processor is configured to: process an input feature vector for the first input data frame using layers of a neural network model to produce external state including a reconstructed first data frame; warp the external state, using difference data corresponding to changes between the first input data frame and the second input data frame, to produce warped external state; and process an input feature vector for the second input data frame using the layers of the neural network model to produce a reconstructed second data frame. The input feature vector for the second input data frame includes: the second input data frame, the warped external state corresponding with the first input data frame, and guide data for one or more effects.

In one embodiment, the at least one processor comprises a parallel processing unit. In some embodiments, a first processor is configured to implement an instance of the neural network model. A second processor is configured to implement a temporal warp function configured to generate the warped external state. In some embodiments, a host processor is configured to distribute a set of training samples to the first processor to train the neural network model to produce the reconstructed second data frame to include the one or more effects.

In one embodiment, the guide data includes motion vectors and/or blur radii. In one embodiment, the motion vectors and the blur radii are encoded in an image, where a first channel of the image encodes a first component of the motion vectors, a second channel of the image encodes a second component of the motion vectors, and a third channel of the image encodes blur radii.

In one embodiment, a non-transitory computer-readable media is disclosed for storing computer instructions for processing images with a neural network model. The computer instructions, when executed by a processor, cause the processor to perform the steps of: processing an input feature vector for a first input data frame of a sequence of input data using layers of a neural network model to produce external state including a reconstructed first data frame; warping the external state, using difference data corresponding to changes between the first input data frame and a second input data frame, to produce warped external state; and processing an input feature vector for the second input data frame using the layers of the neural network model to produce a reconstructed second data frame. The input feature vector for the second input data frame includes the second input data frame, the warped external state corresponding with the first input data frame, and guide data for one or more effects.

DETAILED DESCRIPTION

Figure 1:
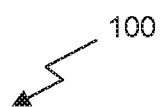
FIG. 1 illustrates a flowchart of a method for reconstructing an image to include visual effects, in accordance with an embodiment.
Figure 1:
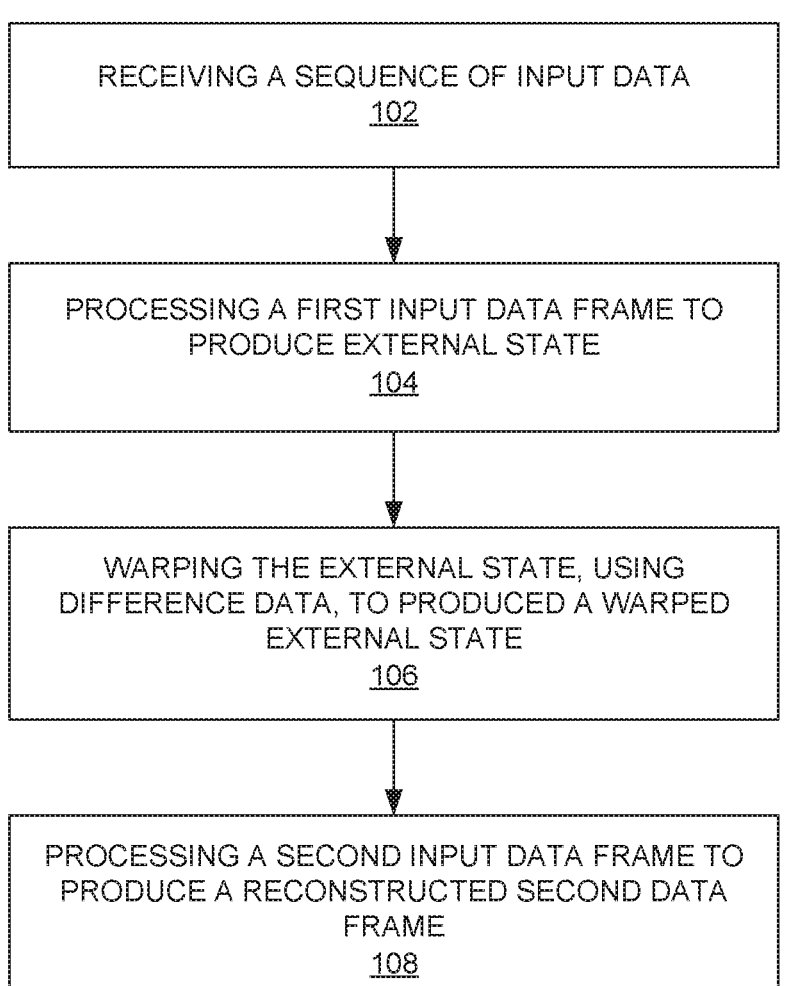

The following Figures describe an approach for reconstructing an image to include various visual effects. More specifically, a warped external recurrent neural network is disclosed that is designed to modify a sequence of images to incorporate one or more visual effects in a temporally stable manner. The effects can include motion blur, depth of field reconstruction (e.g., simulating lens effects), and/or anti-aliasing (e.g., removing artifacts caused by sampling frequency). The warped external recurrent neural network is not recurrent at each layer, where hidden state generated at each layer is provided as a feedback input to the generating layer. Instead, the external state output by the neural network for a previous frame is warped and fed back as an input to the neural network for a next frame.

The external state includes the reconstructed output for only one frame of input data (i.e., the last processed frame in a sequence of frames). By applying the neural network model over an image sequence, one image at a time, the neural network model outputs a sequence of temporally-stable reconstructed images, one image at a time. The neural network model is trained using supervised learning techniques to learn weights and bias values that maximize image quality compared to a reference image generated with the desired effects (e.g., anti-aliasing, motion blur and/or defocus blur).

When the warped external recurrent neural network is applied to generate motion-blurred images, the input images do not include motion blur and the external state includes a reconstructed image that includes motion blur. The external state (i.e., a reconstructed image for a previous frame) is warped according to per-pixel difference data (e.g., motion vectors) to produce warped external state including a processed warped reconstructed image. The warping aligns the external state for the previous frame to the subsequent frame. The per-pixel difference data can be generated by a graphics pipeline configured to render images from 3D models. Alternatively, the per-pixel difference data can be generated based on analysis of a previous input frame with a current input frame such as by matching blocks of pixels in the current input frame with blocks of pixels in the previous input frame to estimate motion vectors for each block or each pixel in the current input frame.

When the warped external recurrent neural network is applied to generate images that include depth of field effects (e.g., Bokeh), the external state includes a reconstructed image that includes depth of field effects, which is warped to correspond to an input image that does not include the depth of field effects. The warped external state and the input image without depth of field effects are included in the feature vector provided as input to the neural network. Similarly, when the warped external recurrent neural network is applied to generate images that reduce aliasing artifacts, the external state includes a reconstructed image that reduces said artifacts, which is warped to correspond to an input image that includes aliasing artifacts. The warped external state and the input image that includes aliasing artifacts are included in the feature vector provided as input to the neural network. In each case, the per-pixel difference data includes the motion vectors. However, the effects discussed above can depend on motion relative to the camera as well as relative motion within an image frame.

It will be appreciated that the neural network can be trained to synthesize multiple effects in a single pass of the neural network, such as: anti-aliasing and motion blur; motion blur and depth of field; or anti-aliasing, motion blur, and depth of field. In such cases, the warped external recurrent neural network generates images that synthesize multiple effects, and the external state is a single reconstructed image having such synthesized effects and warped to correspond to an input image for a subsequent frame that lacks the effects. Both the warped external state and the input image lacking said combination of effects are included in the feature vector provided as input to the neural network.

The feature vector provided as input to the deep learning neural network includes a current frame of input data, a corresponding processed warped reconstructed image from a previous frame of input data; and per-pixel parameters (e.g., guide data) that include metadata related to one or more effects applied to the input data. The per-pixel parameters can include one or more of: motion vectors, surface normal vectors, depth values, and/or depth of field parameters. Motion vectors are two component vectors specifying a horizontal and vertical pixel offset for an object from one frame to the next. Normal vectors are three component vectors specifying an orientation of a surface feature associated with each pixel. Depth values are scalar values that indicate a relative distance of an object from the image place. Depth of field can be specified as a circle of confusion value (e.g., a blur radius, in pixels) that loosely correlates a lens parameter with a depth value. In some embodiments, multiple per-pixel parameters can be encoded in a single image. For example, motion vectors and depth of field values can be encoded in an RGB image, with motion vectors encoded in the red and green components of each pixel and circle of confusion radius encoded in the blue component of each pixel. In other embodiments, the per-pixel parameters can be included in separate channels of the feature vector.

The per-pixel parameters can be generated by a conventional rendering algorithm. For example, G-buffers in a deferred renderer typically hold normal vectors and/or depth values calculated for a frame during a first pass in the deferred renderer. If a particular parameter is not available directly from a renderer, then the parameter can be produced via other techniques, such as post-rendering comparison between images in a sequence of rendered images or specified manually, such as where camera or lens parameters are specified to produce depth of field parameters based on a depth buffer.

The methods and systems described below include a neural network that processes a feature vector provided as input to the neural network to generate an output. The neural network can be implemented as a set of instructions executing on a processor, such as a parallel processing unit. In some embodiments, multiple instances of the neural network can be implemented on different processors simultaneously to process different input data (e.g., different sequences of images).

FIG. 1 illustrates a flowchart of a method 100 for reconstructing an image to include visual effects, in accordance with an embodiment. Although method 100 is described in the context of a processing unit, the method 100 may also be performed by a program, custom circuitry, or by a combination of custom circuitry and a program. For example, the method 100 may be executed by a GPU (graphics processing unit), CPU (central processing unit), or any processor capable of implementing a deep learning neural network, such as the PPU 300 of FIG. 3 as described in more detail below. Furthermore, persons of ordinary skill in the art will understand that any system that performs method 100 is within the scope and spirit of embodiments of the present disclosure.

At step 102, a sequence of input data is received. The sequence is stored in a memory and can include a first input data frame and a second input data frame. In one embodiment, the sequence of input data comprises a sequence of image frames that form a video. Each image frame can be generated by a graphics processing pipeline configured to implement a rendering algorithm. In some embodiments, the graphics processing pipeline is configured to render low-quality images without one or more effects. For example, the images can be rendered using a single sample per pixel rather than using multi-sample anti-aliasing (MSAA) techniques. In addition, the rendering algorithm can omit one or more procedures for producing various effects in the image such as by using temporal anti-aliasing (TAA), adding motion blur, simulating depth of field effects, and the like.

At step 104, an input feature vector for a first input data frame is processed by layers of a neural network model to produce external state including a reconstructed first data frame. The input feature vector for the first input data frame can include the first input data frame, warped external state corresponding to a previous input data frame, and guide data for one or more effects. The guide data can include, but is not limited to, one or more of: motion vectors, blur radii, depth values, or normal vectors. The guide data can include one or more values for each pixel of the first input data frame.

At step 106, the external state is warped, using difference data corresponding to changes between the first input data frame and a second input data frame, to produce warped external state. In an embodiment, the difference data includes per-pixel motion vectors that are used to sample the external state corresponding to the reconstructed first data frame in order to produce the warped external state corresponding to the second input data frame.

At step 108, an input feature vector for a second input data frame is processed by layers of the neural network model to produce a reconstructed second data frame. In an embodiment, the input feature vector for the second input data frame includes the second input data frame, the warped external state corresponding with the first input data frame, and guide data for one or more effects. Again, the guide data can include, but is not limited to, one or more of: motion vectors, blur radii, depth values, or normal vectors. The guide data can include one or more values for each pixel of the second input data frame.

In some embodiments, steps 104 through 108 can be repeated for subsequent input data frames in the sequence of input data, where the external state for a previous frame is warped and provided in the input feature vector for a subsequent frame. The method 100 can be implemented on one or more processors. For example, at least one processor can be configured to implement an instance of the neural network model. Another processor can be configured to implement a temporal warp function configured to generate the warped external state. The processors can share access to a common memory, or the processors can transmit data between memories that are accessible by each of the separate processors.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 2:
FIG. 2 is a conceptual illustration of a system for generating reconstructed images that include synthesized effects, in accordance with an embodiment.
Figure 2:
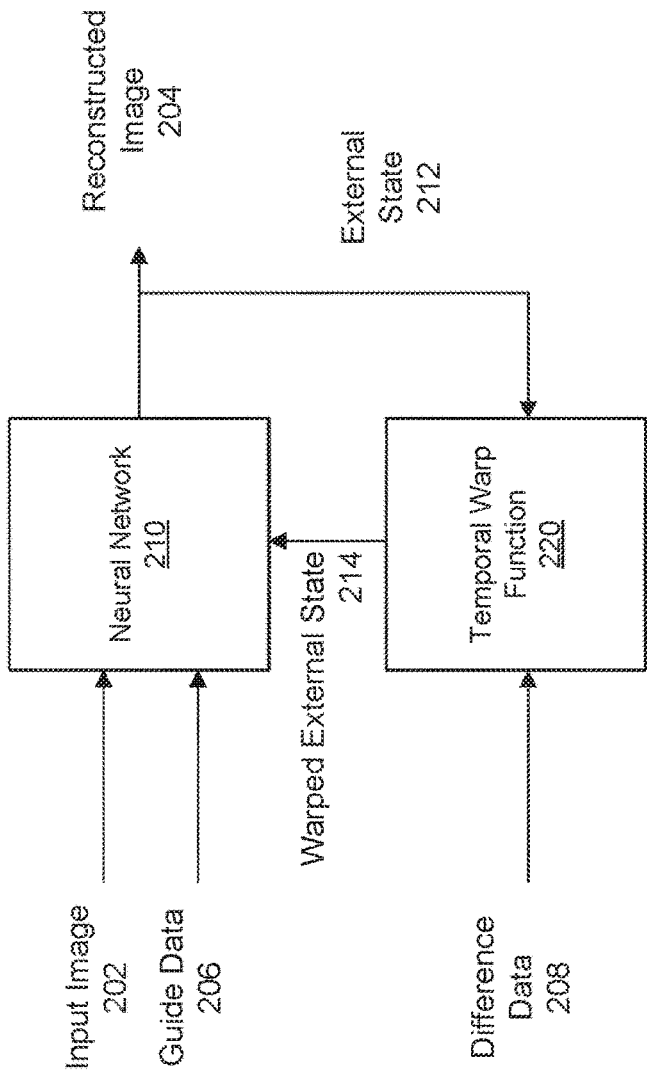

FIG. 2 is a conceptual illustration of a system 200 for generating reconstructed images that include synthesized effects, in accordance with some embodiments. As depicted in FIG. 2, the system 200 includes a neural network model 210 and a temporal warp function 220. The neural network model 210 receives a feature vector as input to the model that includes an input image 202 for a current frame, guide data 206, and warped external state 214. The neural network model 210 generates a reconstructed image 204 for the current frame that includes synthesized effects. The reconstructed image 204 for the current frame is passed to a temporal warp function 220 that generates the warped external state 214 for the next input image 202. In other words, the warped external state 214 for a current frame corresponds with the external state 212 generated at the output of the neural network model 210 for a previous frame.

In an embodiment, the input image 202 is a computer-generated image. The image is provided in an RGB format where each pixel of the image is associated with a scalar value for a red channel, a green channel, and a blue channel. In other embodiments, the input image 202 is provided in other formats such as a RGBA format, YUV format, and the like.

In some embodiments, the input image 202 is processed by a pre-processing module, not explicitly shown, to convert a format of the input image 202 into a different format compatible with the neural network model 210. For example, the pre-processing module can convert the pixel values from a RGBA format with 8-bits per channel to a RGB format with 10 bits per channel. In addition, the pre-processing module can optionally scale, crop, or resize the input image 202 to a particular fixed resolution (e.g., 512×512 pixels). In some cases, the input image 202 is padded with zero values to maintain an aspect ratio of the image rather than stretching the pixel data to fit the fixed resolution.

In an embodiment, the neural network model 210 includes a number of layers that sequentially process the information in the feature vector. The layers can include, but are not limited to, convolution layers, pooling layers, up-sampling layers, and the like. In an embodiment, the neural network model 210 is implemented in accordance with an encoder-decoder framework. A first portion of the neural network model 210—the encoder—reduces a spatial resolution and increases the number of channels of the input to extract a number of features from the input. A second portion of the neural network 210—the decoder—then expands the features to increase the spatial resolution and process the features to generate the output of the neural network model 210. In an embodiment, the reconstructed image 204 includes visual effects such as motion blur, Bokeh, anti-aliasing, or the like where the visual effects were not included in the input image 202.

It will be appreciated that the neural network model 210 is configured to process a series of frames without certain visual effects in order to generate a new series of reconstructed frames that include novel synthesized visual effects. This allows a much simpler rendering algorithm to generate the images without certain visual effects, only later to add the novel visual effects back in a post-processing pass through the neural network model 210. One goal of the system 200 is that the synthesized visual effects should be temporally stable. In other words, a visual effect in one frame should be consistent with the same visual effect in the next frame. For example, blurring an object in motion in one frame should be applied consistently in the next frame as if the object was traveling at approximately the same velocity over the approximate time the shutter of a real camera would be open while capturing the scene. As another example, a depth for objects in the scene is estimated in order to apply a synthesized Bokeh effect associated with a lens and those objects are likely to remain at approximately the same distance from the camera position from frame to frame.

One way to accomplish the goal of temporal stability is to feed the output of the neural network model 210 for a previous frame back as an input to the neural network model 210 for the next frame, where the output is first modified to generate the warped version of the external state 214. The warped version of the external state 214 guides the neural network model 210 to create temporally consistent outputs from frame to frame. However, the warp function has deficiencies where pixels of the current frame did not appear in the previous frame, either due to being off-screen or occluded by another object. Therefore, in one embodiment, one can use the warped external state 214 as one additional input to the neural network model 210 rather than relying on the warp function entirely in generating the reconstructed image 204.

In an embodiment, the temporal warp function 220 receives the external state 212 output by the neural network model 210 and generates the warped version of the external state 214 by executing a function. The function receives per-pixel difference data 208 that specifies how the function modifies the external state 212. In an embodiment, the difference data 208 includes motion vectors. Each pixel or, alternatively, block of pixels in the input image 202 is associated with a motion vector that indicates a relative motion of the object depicted by the pixel or block of pixels between a reconstructed image 204 for a previous frame and the input image 202 for the current frame. It will be appreciated that the motion vectors included in the difference data 208 can also be included in the guide data 206 provided as a portion of the feature vector given as input to the neural network model 210.

In an embodiment, the difference data 208 is generated by a graphics pipeline configured to render images from 3D models, such as the graphics pipeline 600 described in more detail below. Motion vectors may be commonly calculated by the rendering algorithm implemented by the graphics pipeline, and the graphics pipeline can be configured to output a data structure that includes the motion vector information for an image along with the image. In another embodiment, the difference data 208 can be generated based on analysis of a previous frame with a current frame, such as by matching blocks of pixels in the current frame with blocks of pixels in the previous frame to estimate motion vectors for each block or each pixel in the current frame. The difference data 208 can be generated in real-time to produce video streams that include images and corresponding difference data 208 for input to the system 200.

For each pixel of the warped version of the external state 214 for the current frame, a pixel value is generated by sampling the external state 212 for a previous frame at a location offset from the pixel based on the corresponding motion vector. It will be appreciated that the temporal warping function 220 is not perfect at estimating the current frame with visual effects where, for example, pixels in the current frame were occluded in the previous frame. Because the object depicted by that pixel was not visible in the previous frame, the pixel for the current frame must simply be sampled from a different nearby object that may or may not be close in color to the actual pixel in the current frame.

Each component of the system 200 is described in the context of processing units that are configured to implement the system 200. One or more instances of the neural network model 210 or portions thereof may be implemented as a program, custom circuitry, or by a combination of custom circuitry and a program. For example, the layers of the neural network may be implemented by a GPU (graphics processing unit), CPU (central processing unit), or any processor capable of implementing layers of a neural network model. Furthermore, persons of ordinary skill in the art will understand that any system that performs the operations of the neural network model is within the scope and spirit of embodiments of the present disclosure. One such example of a parallel processing unit for implementing one or more of the components of the system 200 is described in more detail below.

Parallel Processing Architecture

Figure 3:
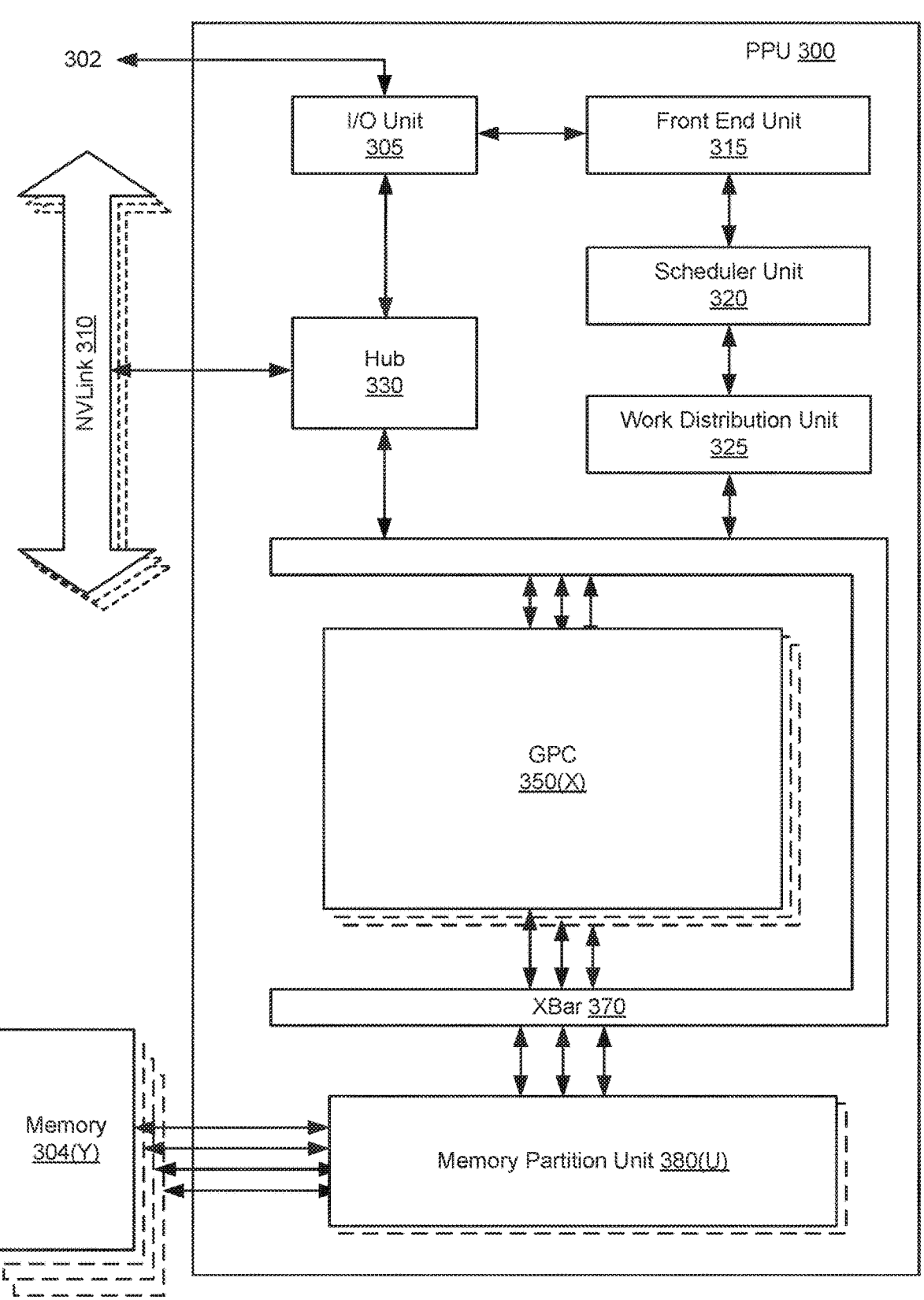
FIG. 3 illustrates a parallel processing unit, in accordance with an embodiment.

FIG. 3 illustrates a parallel processing unit (PPU) 300, in accordance with an embodiment. In an embodiment, the PPU 300 is a multi-threaded processor that is implemented on one or more integrated circuit devices. The PPU 300 is a latency hiding architecture designed to process many threads in parallel. A thread (e.g., a thread of execution) is an instantiation of a set of instructions configured to be executed by the PPU 300. In an embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 300 may be configured to accelerate thousands of High Performance Computing (HPC), data center, and machine learning applications. The PPU 300 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 3, the PPU 300 includes an Input/Output (I/O) unit 305, a front end unit 315, a scheduler unit 320, a work distribution unit 325, a hub 330, a crossbar (Xbar) 370, one or more general processing clusters (GPCs) 350, and one or more memory partition units 380. The PPU 300 may be connected to a host processor or other PPUs 300 via one or more high-speed NVLink 310 interconnect. The PPU 300 may be connected to a host processor or other peripheral devices via an interconnect 302. The PPU 300 may also be connected to a local memory comprising a number of memory devices 304. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 310 interconnect enables systems to scale and include one or more PPUs 300 combined with one or more CPUs, supports cache coherence between the PPUs 300 and CPUs, and CPU mastering. Data and/or commands may be transmitted by the NVLink 310 through the hub 330 to/from other units of the PPU 300 such as one or more copy engines, a video encoder, a video decoder, a power management unit, etc. (not explicitly shown). The NVLink 310 is described in more detail in conjunction with FIG. 5B.

The I/O unit 305 is configured to transmit and receive communications (e.g., commands, data, etc.) from a host processor (not shown) over the interconnect 302. The I/O unit 305 may communicate with the host processor directly via the interconnect 302 or through one or more intermediate devices such as a memory bridge. In an embodiment, the I/O unit 305 may communicate with one or more other processors, such as one or more the PPUs 300 via the interconnect 302. In an embodiment, the I/O unit 305 implements a Peripheral Component Interconnect Express (PCIe) interface for communications over a PCIe bus and the interconnect 302 is a PCIe bus. In alternative embodiments, the I/O unit 305 may implement other types of well-known interfaces for communicating with external devices.

The I/O unit 305 decodes packets received via the interconnect 302. In an embodiment, the packets represent commands configured to cause the PPU 300 to perform various operations. The I/O unit 305 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the I/O unit 305 is configured to route communications between and among the various logical units of the PPU 300.

In an embodiment, a program executed by the host processor encodes a command stream in a buffer that provides workloads to the PPU 300 for processing. A workload may comprise several instructions and data to be processed by those instructions. The buffer is a region in a memory that is accessible (e.g., read/write) by both the host processor and the PPU 300. For example, the I/O unit 305 may be configured to access the buffer in a system memory connected to the interconnect 302 via memory requests transmitted over the interconnect 302. In an embodiment, the host processor writes the command stream to the buffer and then transmits a pointer to the start of the command stream to the PPU 300. The front end unit 315 receives pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In an embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 may also be connected to the XBar 370 via the hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the memory partition units 380, which implement a memory interface for reading and writing data to/from the memory 304. The results can be transmitted to another PPU 304 or CPU via the NVLink 310. In an embodiment, the PPU 300 includes a number U of memory partition units 380 that is equal to the number of separate and distinct memory devices 304 coupled to the PPU 300. A memory partition unit 380 will be described in more detail below in conjunction with FIG. 4B.

In an embodiment, a host processor executes a driver kernel that implements an application programming interface (API) that enables one or more applications executing on the host processor to schedule operations for execution on the PPU 300. In an embodiment, multiple compute applications are simultaneously executed by the PPU 300 and the PPU 300 provides isolation, quality of service (QoS), and independent address spaces for the multiple compute applications. An application may generate instructions (e.g., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 5A.

Figure 4A:
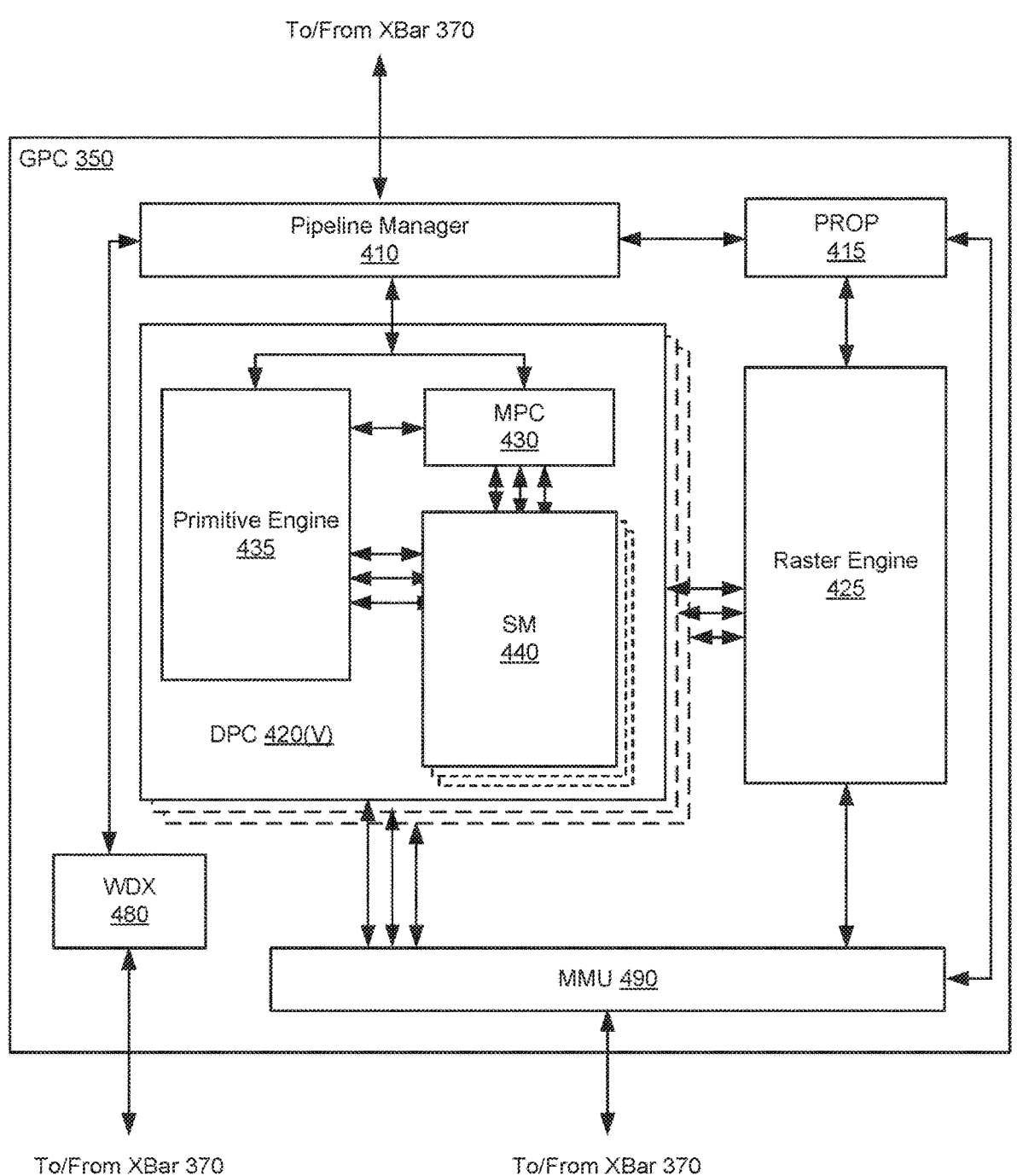
FIG. 4A illustrates a general processing cluster within the parallel processing unit of FIG. 3, in accordance with an embodiment.

FIG. 4A illustrates a GPC 350 of the PPU 300 of FIG. 3, in accordance with an embodiment. As shown in FIG. 4A, each GPC 350 includes a number of hardware units for processing tasks. In an embodiment, each GPC 350 includes a pipeline manager 410, a pre-raster operations unit (PROP) 415, a raster engine 425, a work distribution crossbar (WDX) 480, a memory management unit (MMU) 490, and one or more Data Processing Clusters (DPCs) 420. It will be appreciated that the GPC 350 of FIG. 4A may include other hardware units in lieu of or in addition to the units shown in FIG. 4A.

In an embodiment, the operation of the GPC 350 is controlled by the pipeline manager 410. The pipeline manager 410 manages the configuration of the one or more DPCs 420 for processing tasks allocated to the GPC 350. In an embodiment, the pipeline manager 410 may configure at least one of the one or more DPCs 420 to implement at least a portion of a graphics rendering pipeline. For example, a DPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the DPCs 420 for processing by the primitive engine 435 or the SM 440. In an embodiment, the pipeline manager 410 may configure at least one of the one or more DPCs 420 to implement a neural network model and/or a computing pipeline.

Figure 4B:
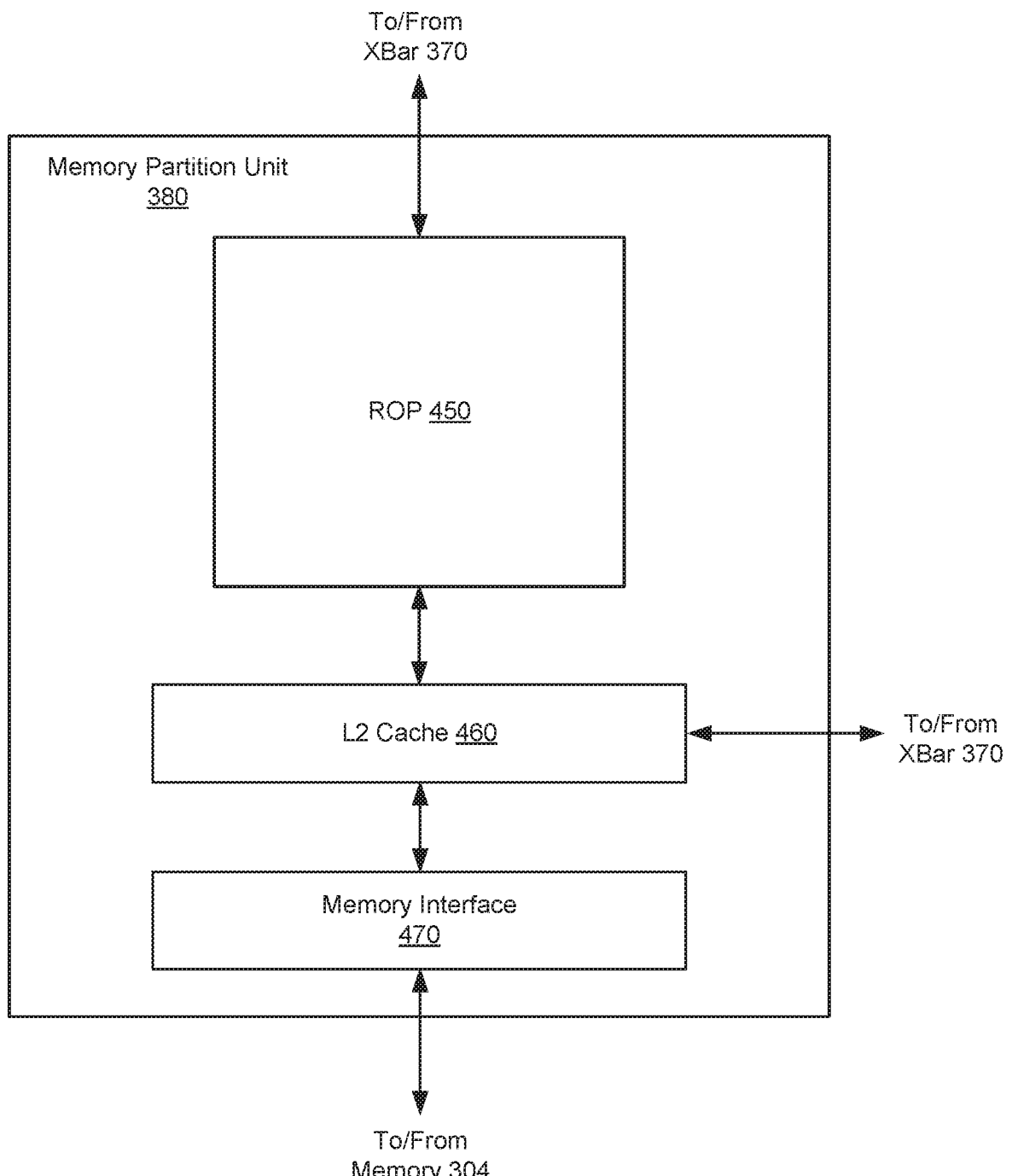
FIG. 4B illustrates a memory partition unit of the parallel processing unit of FIG. 3, in accordance with an embodiment.

The PROP unit 415 is configured to route data generated by the raster engine 425 and the DPCs 420 to a Raster Operations (ROP) unit, described in more detail in conjunction with FIG. 4B. The PROP unit 415 may also be configured to perform optimizations for color blending, organize pixel data, perform address translations, and the like.

The raster engine 425 includes a number of fixed function hardware units configured to perform various raster operations. In an embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 425 comprises fragments to be processed, for example, by a fragment shader implemented within a DPC 420.

Each DPC 420 included in the GPC 350 includes an M-Pipe Controller (MPC) 430, a primitive engine 435, and one or more SMs 440. The MPC 430 controls the operation of the DPC 420, routing packets received from the pipeline manager 410 to the appropriate units in the DPC 420. For example, packets associated with a vertex may be routed to the primitive engine 435, which is configured to fetch vertex attributes associated with the vertex from the memory 304. In contrast, packets associated with a shader program may be transmitted to the SM 440.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In an embodiment, the SM 440 implements a SIMD (Single-Instruction, Multiple-Data) architecture where each thread in a group of threads (e.g., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 440 will be described in more detail below in conjunction with FIG. 5A.

The MMU 490 provides an interface between the GPC 350 and the memory partition unit 380. The MMU 490 may provide translation of virtual addresses into physical addresses, memory protection, and arbitration of memory requests. In an embodiment, the MMU 490 provides one or more translation lookaside buffers (TLBs) for performing translation of virtual addresses into physical addresses in the memory 304.

FIG. 4B illustrates a memory partition unit 380 of the PPU 300 of FIG. 3, in accordance with an embodiment. As shown in FIG. 4B, the memory partition unit 380 includes a Raster Operations (ROP) unit 450, a level two (L2) cache 460, and a memory interface 470. The memory interface 470 is coupled to the memory 304. Memory interface 470 may implement 32, 64, 128, 1024-bit data buses, or the like, for high-speed data transfer. In an embodiment, the PPU 300 incorporates U memory interfaces 470, one memory interface 470 per pair of memory partition units 380, where each pair of memory partition units 380 is connected to a corresponding memory device 304. For example, PPU 300 may be connected to up to Y memory devices 304, such as high bandwidth memory stacks or graphics double-data-rate, version 5, synchronous dynamic random access memory, or other types of persistent storage.

In an embodiment, the memory interface 470 implements an HBM2 memory interface and Y equals half (J. In an embodiment, the HBM2 memory stacks are located on the same physical package as the PPU 300, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 304 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 300 process very large datasets and/or run applications for extended periods.

In an embodiment, the PPU 300 implements a multi-level memory hierarchy. In an embodiment, the memory partition unit 380 supports a unified memory to provide a single unified virtual address space for CPU and PPU 300 memory, enabling data sharing between virtual memory systems. In an embodiment the frequency of accesses by a PPU 300 to memory located on other processors is traced to ensure that memory pages are moved to the physical memory of the PPU 300 that is accessing the pages more frequently. In an embodiment, the NVLink 310 supports address translation services allowing the PPU 300 to directly access a CPU's page tables and providing full access to CPU memory by the PPU 300.

In an embodiment, copy engines transfer data between multiple PPUs 300 or between PPUs 300 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 304 or other system memory may be fetched by the memory partition unit 380 and stored in the L2 cache 460, which is located on-chip and is shared between the various GPCs 350. As shown, each memory partition unit 380 includes a portion of the L2 cache 460 associated with a corresponding memory device 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 performs graphics raster operations related to pixel color, such as color compression, pixel blending, and the like. The ROP unit 450 also implements depth testing in conjunction with the raster engine 425, receiving a depth for a sample location associated with a pixel fragment from the culling engine of the raster engine 425. The depth is tested against a corresponding depth in a depth buffer for a sample location associated with the fragment. If the fragment passes the depth test for the sample location, then the ROP unit 450 updates the depth buffer and transmits a result of the depth test to the raster engine 425. It will be appreciated that the number of memory partition units 380 may be different than the number of GPCs 350 and, therefore, each ROP unit 450 may be coupled to each of the GPCs 350. The ROP unit 450 tracks packets received from the different GPCs 350 and determines which GPC 350 that a result generated by the ROP unit 450 is routed to through the Xbar 370. Although the ROP unit 450 is included within the memory partition unit 380 in FIG. 4B, in other embodiment, the ROP unit 450 may be outside of the memory partition unit 380. For example, the ROP unit 450 may reside in the GPC 350 or another unit.

Figure 5A:
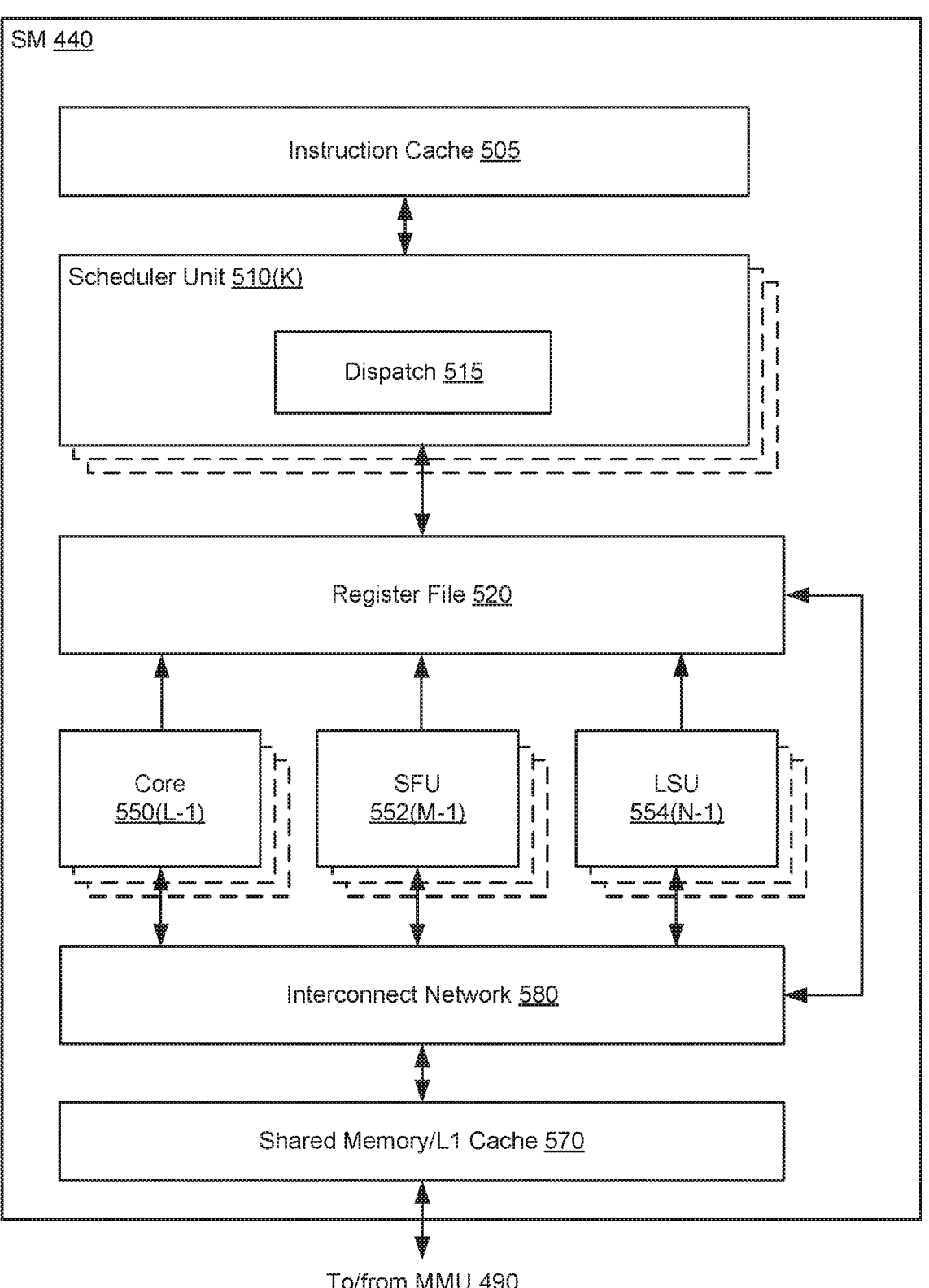
FIG. 5A illustrates the streaming multi-processor of FIG. 4A, in accordance with an embodiment.

FIG. 5A illustrates the streaming multi-processor 440 of FIG. 4A, in accordance with an embodiment. As shown in FIG. 5A, the SM 440 includes an instruction cache 505, one or more scheduler units 510, a register file 520, one or more processing cores 550, one or more special function units (SFUs) 552, one or more load/store units (LSUs) 554, an interconnect network 580, a shared memory/L1 cache 570.

As described above, the work distribution unit 325 dispatches tasks for execution on the GPCs 350 of the PPU 300. The tasks are allocated to a particular DPC 420 within a GPC 350 and, if the task is associated with a shader program, the task may be allocated to an SM 440. The scheduler unit 510 receives the tasks from the work distribution unit 325 and manages instruction scheduling for one or more thread blocks assigned to the SM 440. The scheduler unit 510 schedules thread blocks for execution as warps of parallel threads, where each thread block is allocated at least one warp. In an embodiment, each warp executes 32 threads. The scheduler unit 510 may manage a plurality of different thread blocks, allocating the warps to the different thread blocks and then dispatching instructions from the plurality of different cooperative groups to the various functional units (e.g., cores 550, SFUs 552, and LSUs 554) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 515 is configured to transmit instructions to one or more of the functional units. In the embodiment, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In an embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In an embodiment, the SM 440 includes a large number (e.g., 128, etc.) of distinct processing cores 550. Each core 550 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 550 include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the cores 550. In particular, the tensor cores are configured to perform deep learning matrix arithmetic, such as convolution operations for neural network training and inferencing. In an embodiment, each tensor core operates on a 4×4 matrix and performs a matrix multiply and accumulate operation $D=A \times B+C$, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 440 also comprises M SFUs 552 that perform special functions (e.g., attribute evaluation, reciprocal square root, and the like). In an embodiment, the SFUs 552 may include a tree traversal unit configured to traverse a hierarchical tree data structure. In an embodiment, the SFUs 552 may include texture unit configured to perform texture map filtering operations. In an embodiment, the texture units are configured to load texture maps (e.g., a 2D array of texels) from the memory 304 and sample the texture maps to produce sampled texture values for use in shader programs executed by the SM 440. In an embodiment, the texture maps are stored in the shared memory/L1 cache 470. The texture units implement texture operations such as filtering operations using mip-maps (e.g., texture maps of varying levels of detail). In an embodiment, each SM 340 includes two texture units.

Each SM 440 also comprises N LSUs 554 that implement load and store operations between the shared memory/L1 cache 570 and the register file 520. Each SM 440 includes an interconnect network 580 that connects each of the functional units to the register file 520 and the LSU 554 to the register file 520, shared memory/L1 cache 570. In an embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In an embodiment, the shared memory/L1 cache 570 comprises 128 KB of storage capacity and is in the path from the SM 440 to the memory partition unit 380. The shared memory/L1 cache 570 can be used to cache reads and writes. One or more of the shared memory/L1 cache 570, L2 cache 460, and memory 304 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 570 enables the shared memory/L1 cache 570 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 3, are bypassed, creating a much simpler programming model. In the general purpose parallel computation configuration, the work distribution unit 325 assigns and distributes blocks of threads directly to the DPCs 420. The threads in a block execute the same program, using a unique thread ID in the calculation to ensure each thread generates unique results, using the SM 440 to execute the program and perform calculations, shared memory/L1 cache 570 to communicate between threads, and the LSU 554 to read and write global memory through the shared memory/L1 cache 570 and the memory partition unit 380. When configured for general purpose parallel computation, the SM 440 can also write commands that the scheduler unit 320 can use to launch new work on the DPCs 420.

The PPU 300 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 300 is embodied on a single semiconductor substrate. In another embodiment, the PPU 300 is included in a system-on-a-chip (SoC) along with one or more other devices such as additional PPUs 300, the memory 304, a reduced instruction set computer (RISC) CPU, a memory management unit (MMU), a digital-to-analog converter (DAC), and the like.

In an embodiment, the PPU 300 may be included on a graphics card that includes one or more memory devices 304. The graphics card may be configured to interface with a PCIe slot on a motherboard of a desktop computer. In yet another embodiment, the PPU 300 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5B:
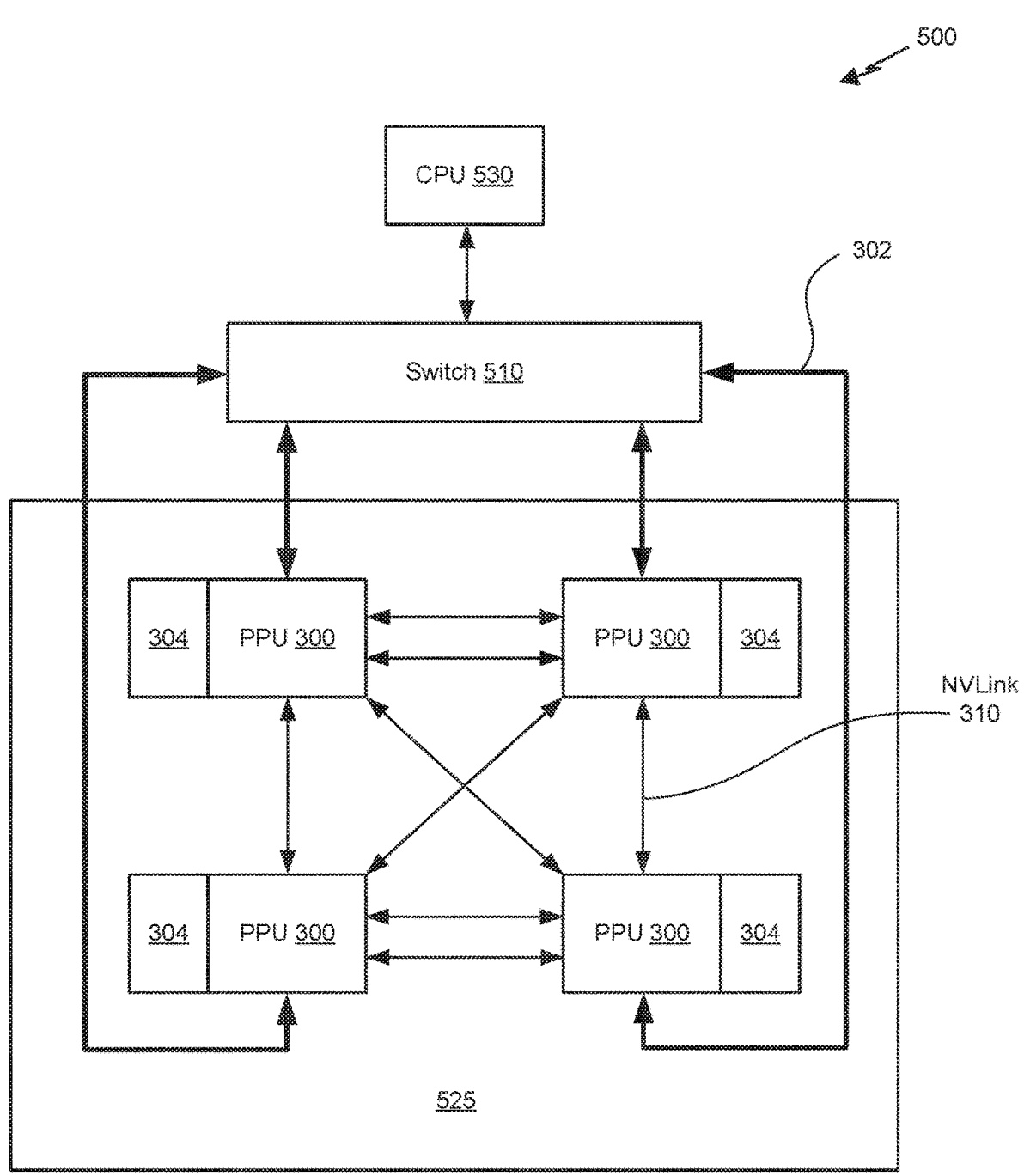
FIG. 5B is a conceptual diagram of a processing system implemented using the PPU of FIG. 3, in accordance with an embodiment.

FIG. 5B is a conceptual diagram of a processing system 500 implemented using the PPU 300 of FIG. 3, in accordance with an embodiment. The exemplary system 565 may be configured to implement the method 100 shown in FIG. 1. The processing system 500 includes a CPU 530, switch 510, and multiple PPUs 300 each coupled to respective memories 304. The NVLink 310 provides high-speed communication links between each of the PPUs 300. Although a particular number of NVLink 310 and interconnect 302 connections are illustrated in FIG. 5B, the number of connections to each PPU 300 and the CPU 530 may vary. The switch 510 interfaces between the interconnect 302 and the CPU 530. The PPUs 300, memories 304, and NVLinks 310 may be situated on a single semiconductor platform to form a parallel processing module 525. In an embodiment, the switch 510 supports two or more protocols to interface between various different connections and/or links.

In another embodiment (not shown), the NVLink 310 provides one or more high-speed communication links between each of the PPUs 300 and the CPU 530 and the switch 510 interfaces between the interconnect 302 and each of the PPUs 300. The PPUs 300, memories 304, and interconnect 302 may be situated on a single semiconductor platform to form a parallel processing module 525. In yet another embodiment (not shown), the interconnect 302 provides one or more communication links between each of the PPUs 300 and the CPU 530 and the switch 510 interfaces between each of the PPUs 300 using the NVLink 310 to provide one or more high-speed communication links between the PPUs 300. In another embodiment (not shown), the NVLink 310 provides one or more high-speed communication links between the PPUs 300 and the CPU 530 through the switch 510. In yet another embodiment (not shown), the interconnect 302 provides one or more communication links between each of the PPUs 300 directly. One or more of the NVLink 310 high-speed communication links may be implemented as a physical NVLink interconnect or either an on-chip or on-die interconnect using the same protocol as the NVLink 310.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 300 and/or memories 304 may be packaged devices. In an embodiment, the CPU 530, switch 510, and the parallel processing module 525 are situated on a single semiconductor platform.

In an embodiment, the signaling rate of each NVLink 310 is 20 to 25 Gigabits/second and each PPU 300 includes six NVLink 310 interfaces (as shown in FIG. 5B, five NVLink 310 interfaces are included for each PPU 300). Each NVLink 310 provides a data transfer rate of 25 Gigabytes/second in each direction, with six links providing 300 Gigabytes/second. The NVLinks 310 can be used exclusively for PPU-to-PPU communication as shown in FIG. 5B, or some combination of PPU-to-PPU and PPU-to-CPU, when the CPU 530 also includes one or more NVLink 310 interfaces.

In an embodiment, the NVLink 310 allows direct load/store/atomic access from the CPU 530 to each PPU's 300 memory 304. In an embodiment, the NVLink 310 supports coherency operations, allowing data read from the memories 304 to be stored in the cache hierarchy of the CPU 530, reducing cache access latency for the CPU 530. In an embodiment, the NVLink 310 includes support for Address Translation Services (ATS), allowing the PPU 300 to directly access page tables within the CPU 530. One or more of the NVLinks 310 may also be configured to operate in a low-power mode.

Figure 5C:
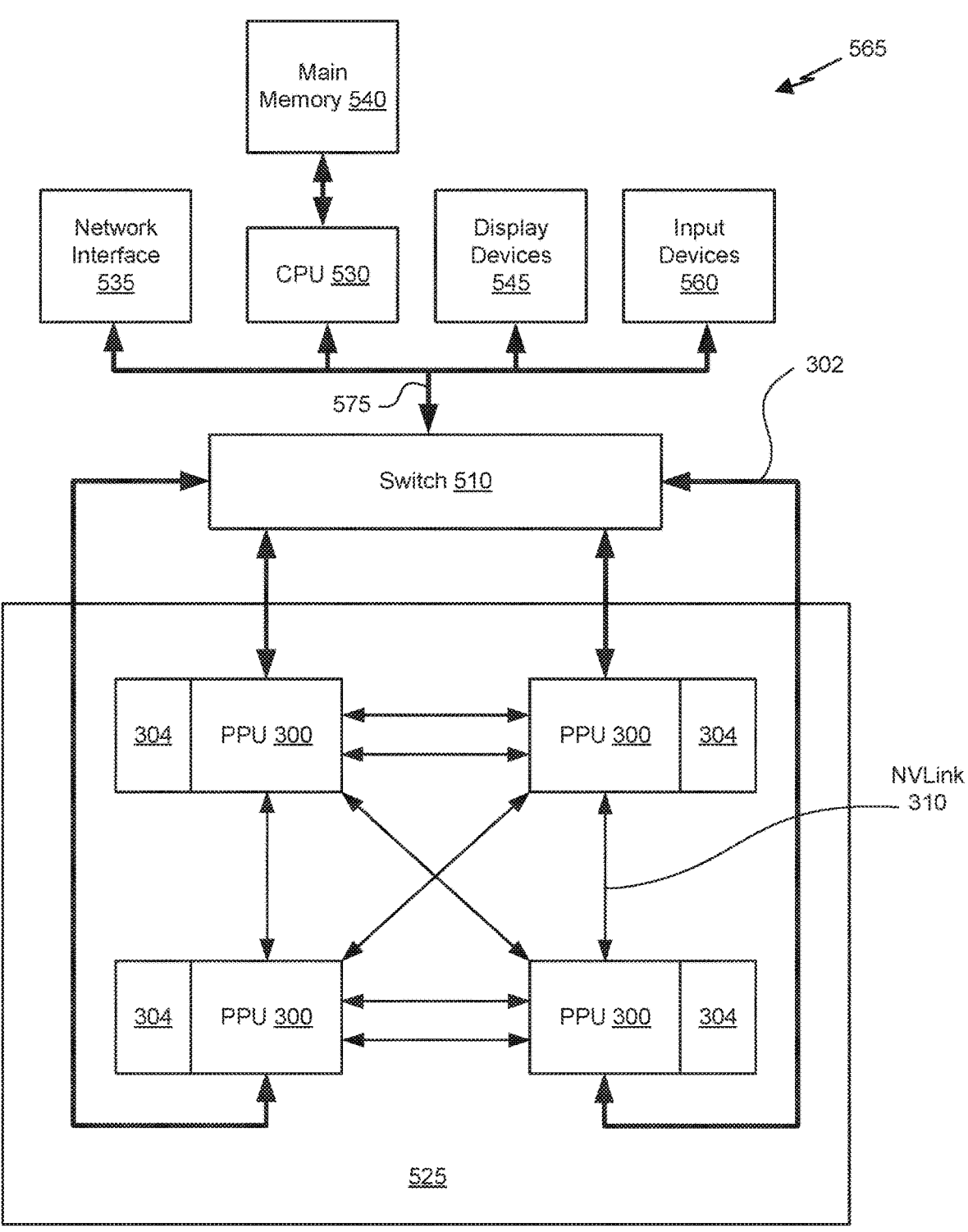
FIG. 5C illustrates an exemplary system in which the various architecture and/or functionality of the various previous embodiments may be implemented.

FIG. 5C illustrates an exemplary system 565 in which the various architecture and/or functionality of the various previous embodiments may be implemented. The exemplary system 565 may be configured to implement the method 100 shown in FIG. 1.

As shown, a system 565 is provided including at least one central processing unit 530 that is connected to a communication bus 575. The communication bus 575 may be implemented using any suitable protocol, such as PCI (Peripheral Component Interconnect), PCI-Express, AGP (Accelerated Graphics Port), HyperTransport, or any other bus or point-to-point communication protocol(s). The system

565 also includes a main memory 540. Control logic (software) and data are stored in the main memory 540 which may take the form of random access memory (RAM).

The system 565 also includes input devices 560, the parallel processing system 525, and display devices 545, e.g. a conventional CRT (cathode ray tube), LCD (liquid crystal display), LED (light emitting diode), plasma display or the like. User input may be received from the input devices 560, e.g., keyboard, mouse, touchpad, microphone, and the like. Each of the foregoing modules and/or devices may even be situated on a single semiconductor platform to form the system 565. Alternately, the various modules may also be situated separately or in various combinations of semiconductor platforms per the desires of the user.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes.

The system 565 may also include a secondary storage (not shown). The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 540 and/or the secondary storage. Such computer programs, when executed, enable the system 565 to perform various functions. The memory 540, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 565 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Graphics Processing Pipeline

In an embodiment, the PPU 300 comprises a graphics processing unit (GPU). The PPU 300 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 300 can be configured to process the graphics primitives to generate a frame buffer (e.g., pixel data for each of the pixels of the display).

An application writes model data for a scene (e.g., a collection of vertices and attributes) to a memory such as a system memory or memory 304. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 440 of the PPU 300 including one or more of a vertex shader, hull shader, domain shader, geometry shader, and a pixel shader. For example, one or more of the SMs 440 may be configured to execute a vertex shader program that processes a number of vertices defined by the model data. In an embodiment, the different SMs 440 may be configured to execute different shader programs concurrently. For example, a first subset of SMs 440 may be configured to execute a vertex shader program while a second subset of SMs 440 may be configured to execute a pixel shader program. The first subset of SMs 440 processes vertex data to produce processed vertex data and writes the processed vertex data to the L2 cache 460 and/or the memory 304. After the processed vertex data is rasterized (e.g., transformed from three-dimensional data into two-dimensional data in screen space) to produce fragment data, the second subset of SMs 440 executes a pixel shader to produce processed fragment data, which is then blended with other processed fragment data and written to the frame buffer in memory 304. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Figure 6:
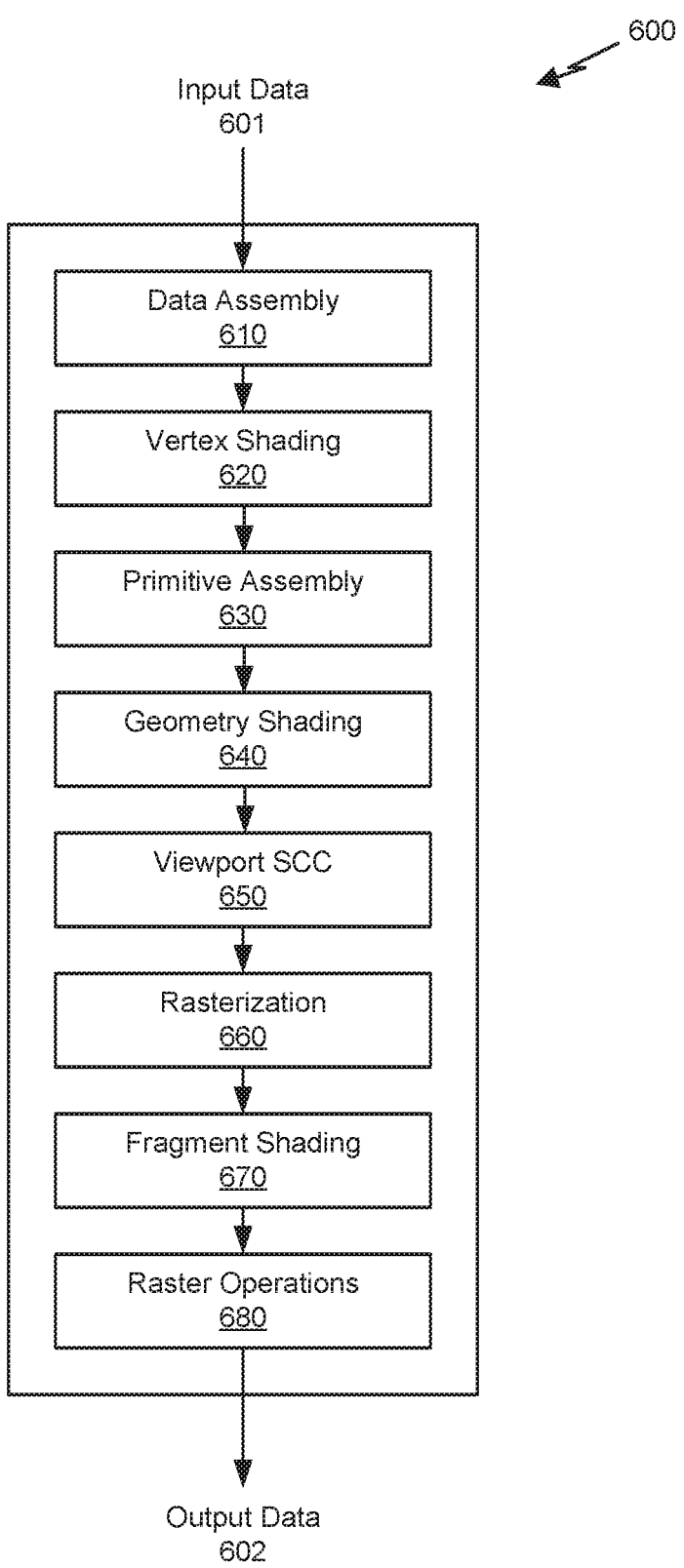
FIG. 6 is a conceptual diagram of a graphics processing pipeline implemented by the parallel processing unit of FIG. 3, in accordance with an embodiment

FIG. 6 is a conceptual diagram of a graphics processing pipeline 600 implemented by the PPU 300 of FIG. 3, in accordance with an embodiment. The graphics processing pipeline 600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 600 receives input data 601 that is transmitted from one stage to the next stage of the graphics processing pipeline 600 to generate output data 602. In an embodiment, the graphics processing pipeline 600 may represent a graphics processing pipeline defined by the OpenGL® API. As an option, the graphics processing pipeline 600 may be implemented in the context of the functionality and architecture of the previous Figures and/or any subsequent Figure(s).

As shown in FIG. 6, the graphics processing pipeline 600 comprises a pipeline architecture that includes a number of stages. The stages include, but are not limited to, a data assembly stage 610, a vertex shading stage 620, a primitive assembly stage 630, a geometry shading stage 640, a viewport scale, cull, and clip (VSCC) stage 650, a rasterization stage 660, a fragment shading stage 670, and a raster operations stage 680. In an embodiment, the input data 601 comprises commands that configure the processing units to implement the stages of the graphics processing pipeline 600 and geometric primitives (e.g., points, lines, triangles, quads, triangle strips or fans, etc.) to be processed by the stages. The output data 602 may comprise pixel data (e.g., color data) that is copied into a frame buffer or other type of surface data structure in a memory.

The data assembly stage 610 receives the input data 601 that specifies vertex data for high-order surfaces, primitives, or the like. The data assembly stage 610 collects the vertex data in a temporary storage or queue, such as by receiving a command from the host processor that includes a pointer to a buffer in memory and reading the vertex data from the buffer. The vertex data is then transmitted to the vertex shading stage 620 for processing.

The vertex shading stage 620 processes vertex data by performing a set of operations (e.g., a vertex shader or a program) once for each of the vertices. Vertices may be, e.g., specified as a 4-coordinate vector (e.g., $<x, y, z, w>$) associated with one or more vertex attributes (e.g., color, texture coordinates, surface normal, etc.). The vertex shading stage 620 may manipulate individual vertex attributes such as position, color, texture coordinates, and the like. In other words, the vertex shading stage 620 performs operations on the vertex coordinates or other vertex attributes associated with a vertex. Such operations commonly including lighting operations (e.g., modifying color attributes for a vertex) and transformation operations (e.g., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 620 generates transformed vertex data that is transmitted to the primitive assembly stage 630.

The primitive assembly stage 630 collects vertices output by the vertex shading stage 620 and groups the vertices into geometric primitives for processing by the geometry shading stage 640. For example, the primitive assembly stage 630 may be configured to group every three consecutive vertices as a geometric primitive (e.g., a triangle) for transmission to the geometry shading stage 640. In some embodiments, specific vertices may be reused for consecutive geometric primitives (e.g., two consecutive triangles in a triangle strip may share two vertices). The primitive assembly stage 630 transmits geometric primitives (e.g., a collection of associated vertices) to the geometry shading stage 640.

The geometry shading stage 640 processes geometric primitives by performing a set of operations (e.g., a geometry shader or program) on the geometric primitives. Tessellation operations may generate one or more geometric primitives from each geometric primitive. In other words, the geometry shading stage 640 may subdivide each geometric primitive into a finer mesh of two or more geometric primitives for processing by the rest of the graphics processing pipeline 600. The geometry shading stage 640 transmits geometric primitives to the viewport SCC stage 650.

In an embodiment, the graphics processing pipeline 600 may operate within a streaming multiprocessor and the vertex shading stage 620, the primitive assembly stage 630, the geometry shading stage 640, the fragment shading stage 670, and/or hardware/software associated therewith, may sequentially perform processing operations. Once the sequential processing operations are complete, in an embodiment, the viewport SCC stage 650 may utilize the data. In an embodiment, primitive data processed by one or more of the stages in the graphics processing pipeline 600 may be written to a cache (e.g. L1 cache, a vertex cache, etc.). In this case, in an embodiment, the viewport SCC stage 650 may access the data in the cache. In an embodiment, the viewport SCC stage 650 and the rasterization stage 660 are implemented as fixed function circuitry.

The viewport SCC stage 650 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (e.g., discarded) because the geometric primitive will not contribute to the final rendered scene. Any geometric primitive that is partially inside the viewing frustum and partially outside the viewing frustum may be clipped (e.g., transformed into a new geometric primitive that is enclosed within the viewing frustum. Furthermore, geometric primitives may each be scaled based on a depth of the viewing frustum. All potentially visible geometric primitives are then transmitted to the rasterization stage 660.

The rasterization stage 660 converts the 3D geometric primitives into 2D fragments (e.g. capable of being utilized for display, etc.). The rasterization stage 660 may be configured to utilize the vertices of the geometric primitives to setup a set of plane equations from which various attributes can be interpolated. The rasterization stage 660 may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization stage 660 generates fragment data (e.g., interpolated vertex attributes associated with a particular sample location for each covered pixel) that are transmitted to the fragment shading stage 670.

The fragment shading stage 670 processes fragment data by performing a set of operations (e.g., a fragment shader or a program) on each of the fragments. The fragment shading stage 670 may generate pixel data (e.g., color values) for the fragment such as by performing lighting operations or sampling texture maps using interpolated texture coordinates for the fragment. The fragment shading stage 670 generates pixel data that is transmitted to the raster operations stage 680.

The raster operations stage 680 may perform various operations on the pixel data such as performing alpha tests, stencil tests, and blending the pixel data with other pixel data corresponding to other fragments associated with the pixel. When the raster operations stage 680 has finished processing the pixel data (e.g., the output data 602), the pixel data may be written to a render target such as a frame buffer, a color buffer, or the like.

It will be appreciated that one or more additional stages may be included in the graphics processing pipeline 600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 640). Other types of graphics processing pipelines are contemplated as being within the scope of the present disclosure. Furthermore, any of the stages of the graphics processing pipeline 600 may be implemented by one or more dedicated hardware units within a graphics processor such as PPU 300.

Other stages of the graphics processing pipeline 600 may be implemented by programmable hardware units such as the SM 440 of the PPU 300.

The graphics processing pipeline 600 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the PPU 300. The API provides an abstraction for a programmer that lets a programmer utilize specialized graphics hardware, such as the PPU 300, to generate the graphical data without requiring the programmer to utilize the specific instruction set for the PPU 300. The application may include an API call that is routed to the device driver for the PPU 300. The device driver interprets the API call and performs various operations to respond to the API call. In some instances, the device driver may perform operations by executing instructions on the CPU. In other instances, the device driver may perform operations, at least in part, by launching operations on the PPU 300 utilizing an input/output interface between the CPU and the PPU 300. In an embodiment, the device driver is configured to implement the graphics processing pipeline 600 utilizing the hardware of the PPU 300.

Various programs may be executed within the PPU 300 in order to implement the various stages of the graphics processing pipeline 600. For example, the device driver may launch a kernel on the PPU 300 to perform the vertex shading stage 620 on one SM 440 (or multiple SMs 440). The device driver (or the initial kernel executed by the PPU 400) may also launch other kernels on the PPU 400 to perform other stages of the graphics processing pipeline 600, such as the geometry shading stage 640 and the fragment shading stage 670. In addition, some of the stages of the graphics processing pipeline 600 may be implemented on fixed unit hardware such as a rasterizer or a data assembler implemented within the PPU 400. It will be appreciated that results from one kernel may be processed by one or more intervening fixed function hardware units before being processed by a subsequent kernel on an SM 440.

Machine Learning

Deep neural networks (DNNs) developed on processors, such as the PPU 300 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 300. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 300 is a computing platform capable of delivering performance required for deep neural network-based artificial intelligence and machine learning applications.

Generating Reconstructed Images with Synthesized Visual Effects

Figure 7:
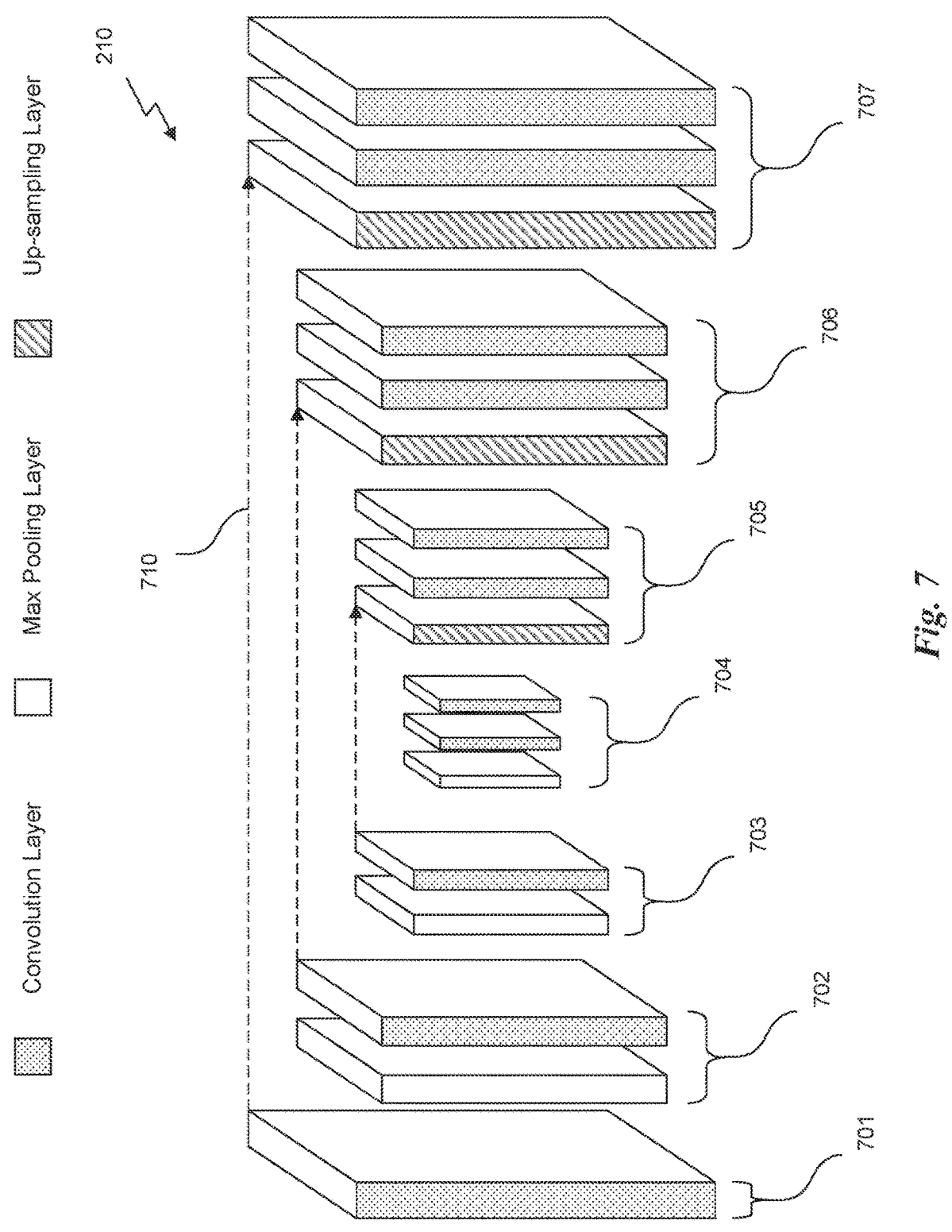
FIG. 7 illustrates the structure of the neural network model, in accordance with some embodiments.

FIG. 7 illustrates the structure of the neural network model 210, in accordance with some embodiments. As depicted in FIG. 7, the neural network model 210 includes a number of layers arranged in accordance with an encoder-decoder framework. Each layer can be implemented by executing one or more operations on the PPU 300. The layers are separated into a number of stages that are executed sequentially, where the output of one stage is provided as the input to another stage. The neural network model 210 also includes a number of skip-links 710 where the output of a particular stage of the encoder is forwarded to a corresponding stage of the decoder, thereby combining the spatial information from the encoder with the up-sampled feature information processed by the decoder.

In an embodiment, the neural network model 210 includes four stages in the encoder section. A first stage 701 includes a convolution layer that applies a convolution operation to the input received by the neural network model 210. In an embodiment, the convolution operation applies convolution kernels to one or more channels of the input to generate a set of corresponding feature maps. The size of each convolution kernel can be, e.g., 3×3 or 5×5. It will be appreciated that, in other embodiments, the convolution operation can be adjusted to use a different sized convolution kernel (e.g., 3×3 or 7×7). In some embodiments, the convolution operation can be a 3D convolution operation that applies a 3D convolution kernel to multiple channels of the input to generate a single channel of the output.

In some embodiments, the output of the convolution layer can be input to a batch normalization layer, used during training, which is used to normalize the results of the convolution operation across a batch of training samples. The normalized values can also be processed by an activation function, such as a rectified linear unit (ReLU), a leaky ReLU, or a sigmoid function.

In an embodiment, a second stage 702 includes a max pooling layer followed by a convolution layer. The max pooling layer reduces the spatial resolution of the input by sampling regions of the input and selecting the maximum value within the region as a value for a single element of the down-sampled output. For example, the max pooling layer can reduce the spatial resolution in half, in each dimension in the pixel space, using a 2×2 pixel sampling region. The down-sampled output is passed to the convolution layer, which applies a convolution operation to the down-sampled output. Again, the output of the convolution layer can be input to a batch normalization layer and an activation function.

In an embodiment, a third stage 703 includes a max pooling layer followed by a convolution layer. A fourth stage 704 includes a max pooling layer followed by two convolution layers. Again, each convolution layer can be followed by a batch normalization layer and/or an activation function. The output of the fourth stage 704 is then provided to a decoder section that includes three stages.

In an embodiment, the first stage 705 of the decoder section includes an up-sampling layer followed by two convolution layers. The up-sampling layer increases the spatial resolution of the input by performing nearest neighbor interpolation. In other embodiments, the up-sampling layer can implement a different type of interpolation such as bilinear interpolation. The output of the up-sampling layer is combined (e.g., concatenated) with the output of a corresponding stage of the encoder section via the skip link 710. The second stage 706 and third stage 707 of the decoder section similarly include an up-sampling layer followed by two convolution layers. The skip links 710 provide the output of the third stage 703 of the encoder section to the first stage 705 of the decoder section, the output of the second stage 702 of the encoder section to the second stage 706 of the decoder section, and the output of the first stage 701 of the encoder section to the third stage 707 of the decoder section, respectively.

In an embodiment, each convolution layer is configured to either increase or decrease the number of channels of the input based on a number of convolution kernels implemented by the convolution layer. For example, the input feature vector to the neural network model 210 can include three channels for the input image 202 (e.g., a red channel, a green channel, and a blue channel), three channels for the warped version of the external state 214, and one or more channels of guide data 206. The guide data 206 can include, e.g., normal vectors, motion vectors, depth values, circle of confusion values, or the like corresponding with the input image 202. The first convolution layer can increase the number of channels from, e.g., 8 channels to 64 channels, each channel representing a separate feature map. Subsequent convolution layers can increase the number of channels from 64 to 128, 128 to 256, 256 to 512, and so forth. The decoder can then reduce the channels from, e.g., 512 channels to 256, 256 to 128, and 128 to a final 3 channel output that represents the red channel, the green channel, and the blue channel of the reconstructed image 204 including the synthesized effects.

It will be appreciated that the neural network model 210 depicted in FIG. 7 is merely one example of the architecture of the neural network model 210. Various embodiments can include additional layers or numbers of stages, replace the max pooling layers with modified convolution layers that utilize a stride of 2 or more for down-sampling, or add fully connected layers at the output of the decoder sections, for example.

Figure 8:
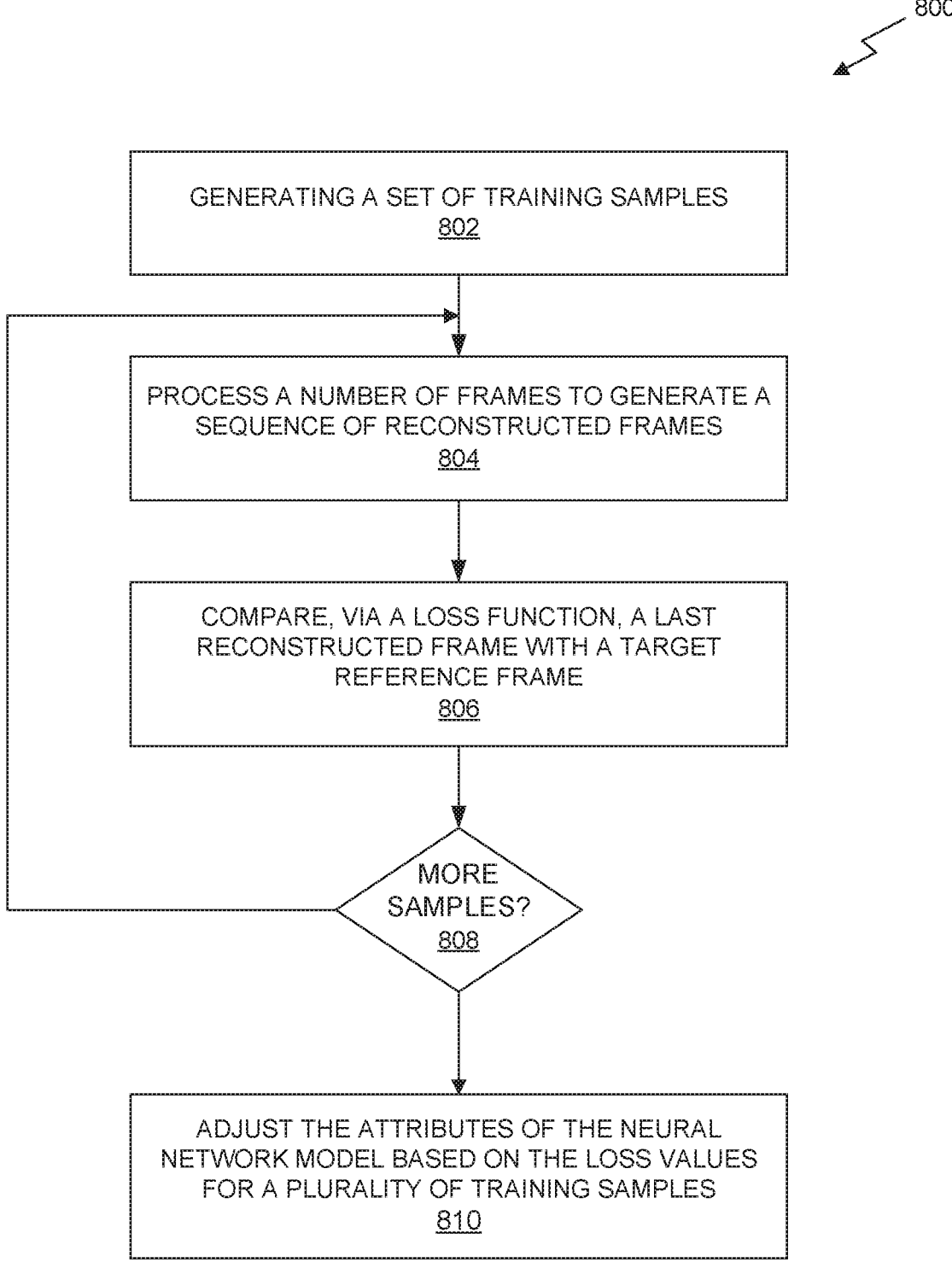
FIG. 8 illustrates a flowchart of a method for training the neural network model, in accordance with an embodiment.

FIG. 8 illustrates a flowchart of a method 800 for training the neural network model 210, in accordance with an embodiment. Although method 800 is described in the context of a processing unit, the method 800 may also be performed by a program, custom circuitry, or by a combination of custom circuitry and a program. For example, the method 800 may be executed by a GPU (graphics processing unit), CPU (central processing unit), or any processor capable of implementing a deep learning neural network. Furthermore, persons of ordinary skill in the art will understand that any system that performs method 800 is within the scope and spirit of embodiments of the present disclosure.

At step 802, a set of training samples are generated. Each training sample includes a sequence of computer-generated frames. In an embodiment, a sequence of 25 frames is generated by the graphics processing pipeline 600 as implemented by, e.g., a video game. Then, four or eight frames can be randomly selected from the sequence of frames. The sequence of frames is generated with and without visual effects. For example, a first pass of the graphics pipeline 600 can be configured to render the sequence of frames at a low quality using, for example, a fragment shader configured to utilize 1 sample per pixel (spp). In addition, certain portions of the rendering pipeline (e.g., fragment shaders or portions thereof) can be disabled, thereby omitting processing operations that could be used to introduce visual effects into the scene, for example. In some embodiments, difference data can also be generated during the first pass of the graphics processing pipeline 600. A second pass of the graphics processing pipeline 600 can be configured to render the sequence of frames at a high quality using, for example, a fragment shader configured to utilize 256 spp or more. In addition, the fragment shader(s) or other post-processing stages can be adjusted to implement certain processing operations, such as enabling temporal anti-aliasing or other visual effects. The high quality images represent the reference targets for the corresponding low-quality images that represent the input images 202 for the neural network model 210.

It will be appreciated that the set of training samples is generated over multiple domains, such as by utilizing different video games and/or different scenes within the same video game. The set of training samples should be large enough to provide a good variety of examples for the neural network model 210 to learn. For example, the set of training samples can include tens of thousands of sequences of frames.

At step 804, for each training sample in a plurality of training samples, a number of low-quality frames (e.g., 4 frames) are processed by the neural network model 210 to generate a sequence of reconstructed frames. It will be appreciated that the external recurrent neural network model 210 utilizes memory of previous frames in generating new frames. More specifically, the reconstructed image 204 for a current frame relies on the warped external state 214 for a previous frame, and the reconstructed image 204 for the previous frame relies on the warped external state 214 for a frame prior to the previous frame, and so on and so forth. In theory, the neural network model 210 has infinite memory when constructing the current reconstructed frame 204 of all previous frames generated for the sequence of frames. However, when training the neural network model 210, the extent of memory can be limited to a reasonable number of frames, such as 4 or 8 frames.

In an embodiment, a first frame in the sequence of frames is processed by the neural network model 210. The external state 212 that is applied to the temporal warp function 220 for this first frame can be a frame where all values are zero. The temporal warp function 220 then generates the warped external state 214 using the external state 212 and difference data 208 that includes a set of motion vectors. Although the blank external state 212 does not accurately reflect a reconstructed image for a previous frame warped to match the current frame, the other components of the feature vector are processed by the neural network model 210 to generate a reconstructed image 204 for the first frame. This reconstructed image 204 is then fed back to the temporal warp function 220 for generating the warped external state 214 for the second frame. The second frame, third frame, and fourth frame are processed in the same manner, generating a second reconstructed image, a third reconstructed image, and a fourth reconstructed image, respectively.

In other embodiments, a high-quality image corresponding to a frame immediately prior to the first frame in the sequence of frames is provided as substitute for the external state 212 for a previous frame during processing of the first frame in the sequence of frames. The high-quality image can be generated by the graphics processing pipeline 600 during the second pass and included in the training sample along with the sequence of frames.

At step 806, the last reconstructed frame in the sequence of each frames is compared to a target reference frame corresponding to the last reconstructed frame. In an embodiment, a loss function computes an L1 norm over the pixels of the frame to generate a value that represents the difference between the reconstructed frame generated by the neural network model 210 and the target reference frame. In other embodiments, the loss function can compute an L2 norm instead of the L1 norm. In yet other embodiments, the loss function can compute multiple components, with each component representing an L1 or L2 norm of a particular intermediate output produced by a given layer of the neural network model 210.

In an embodiment, the loss function is equal to a weighted sum of two L2 components. A first L2 component is calculated as the L2 difference between the target reference frame and the reconstructed frame. The second L2 component is calculated as the L2 difference between a target reference frame gradient and a reconstructed frame gradient. The target reference frame gradient is calculated as the difference between the target reference frame for the current frame at time n and the target reference frame for the previous frame at time n−1. The reconstructed frame gradient is calculated as the difference between the reconstructed frame for the current frame at time n and the reconstructed frame for the previous frame at time n−1. In other words, the loss function can be written as:

$$LOSS_{L2}=\Sigma(GT_n-I_n)^2+\Sigma([GT_n-GT_{n-1}]-[I_n-I_{n-1}])_2 \qquad \text{(Eq. 1)}$$

At step 808, a determination is made as to whether additional training samples should be processed in the current batch of training samples. In some embodiments, a batch of training samples is processed prior to adjusting the attributes of the neural network model 210. If additional training samples are available, then the method returns to step 804 where the next training sample is processed. However, if there are no more training samples to process in the batch, then the method 800 proceeds to step 810.

At step 810, the value(s) computed by the loss function can be used to adjust the attributes of the neural network model 210. The attributes can refer to the weights and/or bias values of each of the convolution layers (e.g., the coefficients of the convolution kernels implemented by each layer). In some embodiments, the attributes of the neural network model 210 are adjusted after a plurality of training samples have been processed. For example, a batch of 16 training samples are processed, and then the outputs of the loss function are combined to adjust the attributes based on the average loss over the entire batch of training samples.

Figures 9A, 9B:
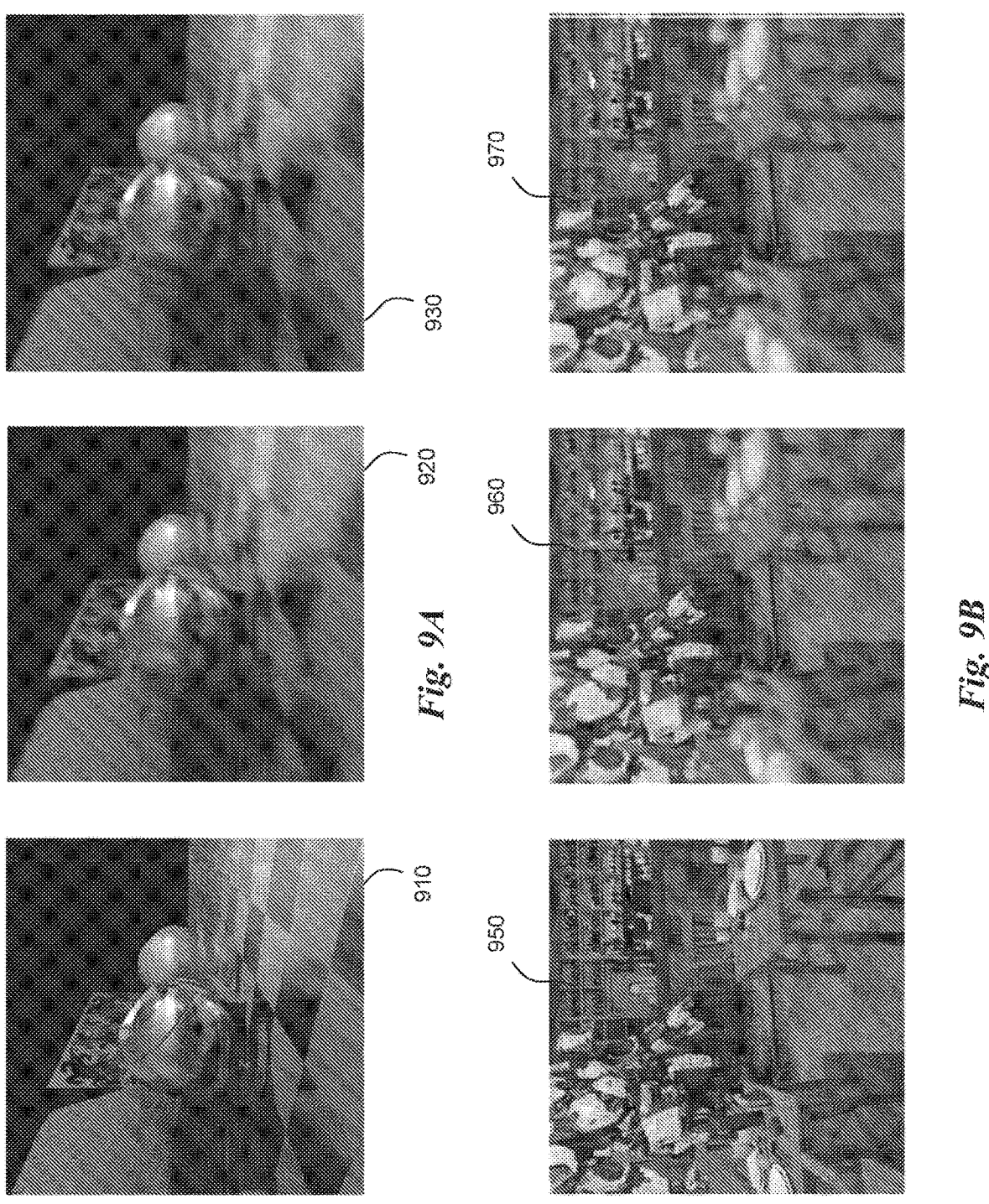
FIG. 9A is a first example of the output generated by the neural network model, in accordance with an embodiment.
FIG. 9B is a second example of the output generated by the neural network model, in accordance with an embodiment.

FIG. 9A is a first example of the output generated by the neural network model, in accordance with an embodiment. As depicted in FIG. 9A, an input image 910 was generated with 1 spp and does not include a motion blur effect. In addition, the 1 spp rendering technique results in aliasing artifacts in the input image 910. The neural network model 210, after being trained, can be used to generate a reconstructed image 920 that includes both motion blur effects and simulates anti-aliasing techniques by reducing the aliasing artifacts. The reconstructed image 920 is similar to a target reference image 930 corresponding to the input image 910, where the target reference image 930 was generated using, e.g., 256 spp and advanced fragment shaders during rendering that add motion blur effects.

FIG. 9B is a second example of the output generated by the neural network model, in accordance with an embodiment. As depicted in FIG. 9B, an input image 950 was generated with 1 spp and does not include a depth of field effect. In addition, the 1 spp rendering technique results in aliasing artifacts in the input image 950. The neural network model 210, after being trained, can be used to generate a reconstructed image 960 that includes both depth of field effects and simulates anti-aliasing techniques by reducing the aliasing artifacts. The reconstructed image 960 is similar to a target reference image 970 corresponding to the input image 950, where the target reference image 970 was generated using, e.g., 384 spp and advanced fragment shaders during rendering.

The external warped recurrent neural network model 210, described in detail above, enables simplified rendering algorithms to produce low-quality images in real-time that are processed by the neural network model 210 to produce simulated high-quality images that closely resemble computer-generated images produced with much more complicated and time-consuming rendering algorithm. Furthermore, the neural network model 210 can be trained to effectively simulate multiple visual effects simultaneously, such as motion blur, depth of field from lens parameters, and anti-aliasing from multi-sample anti-aliasing. These techniques can vastly improve the photo-realism of computer-generated images without requiring the implementation of complex rendering algorithms that may struggle to produce video sequences in real-time with adequate frame rates.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. One or more processors, comprising:
   circuitry to:
   generate information describing one or more characteristics of one or more blur effects applied by one or more neural networks to generate one or more previous frames of a video; and
   use the one or more neural networks to apply at least one of the one or more blur effects to one or more objects in a frame of the video, based at least in part, on one or more inputs of the one or more neural networks comprising the information describing the one or more characteristics of the one or more blur effects used to generate the one or more previous frames of the video.

2. The one or more processors of claim 1, wherein the one or more blur effects used to generate the one or more previous frames of the video include at least one of a motion blur effect and a depth of field blur effect.

3. The one or more processors of claim 1, wherein the at least one of the one or more blur effects are applied using per-pixel difference data, based on a comparison between the frame and the one or more previous frames of the video.

4. The one or more processors of claim 1, wherein the at least one of the one or more blur effects are applied using per-pixel difference data, based on a comparison between the frame and the one or more previous frames of the video, that comprises one or more motion vectors, the one or more motion vectors indicating a relative motion of the one or more objects in the one or more previous frames of the video.

5. The one or more processors of claim 1, wherein the one or more blur effects used to generate the one or more previous frames of the video are associated with per-pixel parameters including metadata related to the one or more blur effects used to generate the one or more previous frames of the video.

6. The one or more processors of claim 5, wherein the per-pixel parameters include one or more of motion vectors, surface normal vectors, depth values, and depth of field parameters.

7. The one or more processors of claim 1, wherein the frame and the one or more previous frames of the video are provided by a graphics processing pipeline configured to render images from one or more three-dimensional models.

8. A system comprising:
   one or more processors to:
   generate information describing one or more characteristics of one or more blur effects applied by one or more neural networks to generate one or more previous frames of a video; and
   use the one or more neural networks to apply at least one of the one or more blur effects to one or more objects in a frame of the video based, at least in part, on one or more inputs of the one or more neural networks comprising the information describing the one or more characteristics of the one or more blur effects used to generate the one or more previous frames of the video.

9. The system of claim 8, wherein the one or more blur effects used to generate the one or more previous frames of the video include at least one of a motion blur effect and a depth of field blur effect.

10. The system of claim 8, wherein the at least one of the one or more blur effects are applied using per-pixel difference data, based on a comparison between the frame and the one or more previous frames of the video.

11. The system of claim 10, wherein the per-pixel difference data includes one or more motion vectors, the one or more motion vectors indicating a relative motion of the one or more objects in the one or more previous frames of the video.

12. The system of claim 8, wherein the one or more blur effects used to generate the one or more previous frames of the video are associated with per-pixel parameters including metadata related to the one or more blur effects used to generate the one or more previous frames of the video, wherein the per-pixel parameters include one or more of motion vectors, surface normal vectors, depth values, and depth of field parameters.

13. The system of claim 8, wherein the frame and the one or more previous frames of the video are provided by a graphics processing pipeline configured to render images from one or more three-dimensional models.

14. A method comprising:

generating information describing one or more characteristics of one or more blur effects applied by one or more neural networks to generate one or more previous frames of a video; and applying, using the one or more neural networks, at least one of the one or more blur effects to one or more objects in a frame of the video based, at least in part, on one or more inputs of the one or more neural networks comprising the information describing the one or more characteristics of the one or more blur effects used to generate the one or more previous frames of the video.

15. The method of claim 14, wherein the one or more blur effects used to generate the one or more previous frames of the video include at least one of a motion blur effect and a depth of field blur effect.

16. The method of claim 14, wherein at least one of the one or more blur effects are applied using per-pixel difference data, based on a comparison between the frame and the one or more previous frames of the video.

17. The method of claim 16, wherein the per-pixel difference data includes one or more motion vectors, the one or more motion vectors indicating a relative motion of the one or more objects in the one or more previous frames of the video.

18. The method of claim 14, wherein the one or more blur effects used to generate the one or more previous frames of the video are associated with per-pixel parameters including metadata related to the one or more blur effects used to generate the one or more previous frames of the video.

19. The method of claim 18, wherein the per-pixel parameters include one or more of motion vectors, surface normal vectors, depth values, and depth of field parameters.

20. The method of claim 14, wherein the frame and the one or more previous frames of the video are provided by a graphics processing pipeline configured to render images from one or more three-dimensional models.

* * * * *